US012101513B2

(12) United States Patent
Choi et al.

(10) Patent No.: US 12,101,513 B2
(45) Date of Patent: Sep. 24, 2024

(54) ELECTRONIC DEVICE AND METHOD FOR OPERATING SAME

(71) Applicant: Samsung Electronics Co., Ltd., Suwon-si (KR)

(72) Inventors: Kilsoo Choi, Suwon-si (KR); Kwansik Yang, Suwon-si (KR); Sehyun Kim, Suwon-si (KR); Jongin Lee, Suwon-si (KR); Jiwon Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 28 days.

(21) Appl. No.: 18/116,468

(22) Filed: Mar. 2, 2023

(65) Prior Publication Data

US 2023/0209101 A1    Jun. 29, 2023

Related U.S. Application Data

(63) Continuation of application No. PCT/KR2021/011869, filed on Sep. 2, 2021.

(30) Foreign Application Priority Data

Sep. 2, 2020 (KR) .......................... 10-2020-0111688

(51) Int. Cl.
*H04N 21/218*    (2011.01)
*H04N 21/2365*   (2011.01)

(52) U.S. Cl.
CPC ... *H04N 21/21805* (2013.01); *H04N 21/2365* (2013.01)

(58) Field of Classification Search
CPC ............... H04N 21/21805; H04N 21/2365
See application file for complete search history.

(56) References Cited

U.S. PATENT DOCUMENTS 9,716,912 B2   7/2017 Lee et al.
9,756,398 B2 * 9/2017 Lee .................. H04N 21/25891
(Continued)

FOREIGN PATENT DOCUMENTS

KR    10-0838982        6/2008
KR    20080056588 A  *  6/2008
(Continued)

OTHER PUBLICATIONS

International Search Report, PCT/ISA/210, dated Dec. 23, 2021, in PCT Application No. PCT/KR2021/011869.
(Continued)

*Primary Examiner* — Nicholas T Corbo
(74) *Attorney, Agent, or Firm* — STAAS & HALSEY LLP

(57) ABSTRACT

Provided are an electronic device and a method of operating the electronic device. The electronic device includes a memory storing one or more instructions, and a processor configured to execute the one or more instructions stored in the memory to analyze content displayed on a display to recognize a channel providing the content, execute a multi-streaming service application corresponding to the recognized channel as a background, request multi-streaming service information regarding the content from a server through the multi-streaming service application, receive the multi-streaming service information in response to the request, based on the received multi-streaming service information, display a user interface notifying that a multi-streaming service regarding the content is available, and, according to a user input received in response to the user interface, activate and execute the multi-streaming service application.

15 Claims, 16 Drawing Sheets

(56) References Cited

U.S. PATENT DOCUMENTS

| | | |
|---|---|---|
| 10,802,708 B2 | 10/2020 | Lee et al. |
| 11,556,977 B2 | 1/2023 | Kang et al. |
| 2009/0183205 A1 | 7/2009 | McCartie et al. |
| 2014/0368734 A1 | 12/2014 | Hoffert et al. |
| 2015/0195515 A1 | 7/2015 | Lee |
| 2016/0205448 A1 | 7/2016 | Yoon et al. |
| 2016/0286263 A1 | 9/2016 | Jung et al. |
| 2017/0230708 A1 | 8/2017 | Phillips et al. |
| 2019/0187873 A1 | 6/2019 | Kim et al. |
| 2020/0018687 A1 | 1/2020 | Lavrovsky et al. |

FOREIGN PATENT DOCUMENTS

| | | |
|---|---|---|
| KR | 20090068711 A * | 6/2009 |
| KR | 10-2013-0124559 | 11/2013 |
| KR | 10-2015-0046833 | 5/2015 |
| KR | 10-2015-0083243 | 7/2015 |
| KR | 10-2016-0040176 | 4/2016 |
| KR | 10-2016-0105030 | 9/2016 |
| KR | 10-2016-0115264 | 10/2016 |
| KR | 10-2019-0021814 | 3/2019 |
| KR | 10-1955463 | 3/2019 |
| KR | 10-2019-0073682 | 6/2019 |
| KR | 10-2019-0134298 | 12/2019 |
| KR | 10-2020-0013145 | 2/2020 |
| KR | 10-2020-0071283 | 6/2020 |

OTHER PUBLICATIONS

Office Action dated Dec. 22, 2023, in European Application No. EP 21 86 4687.

* cited by examiner

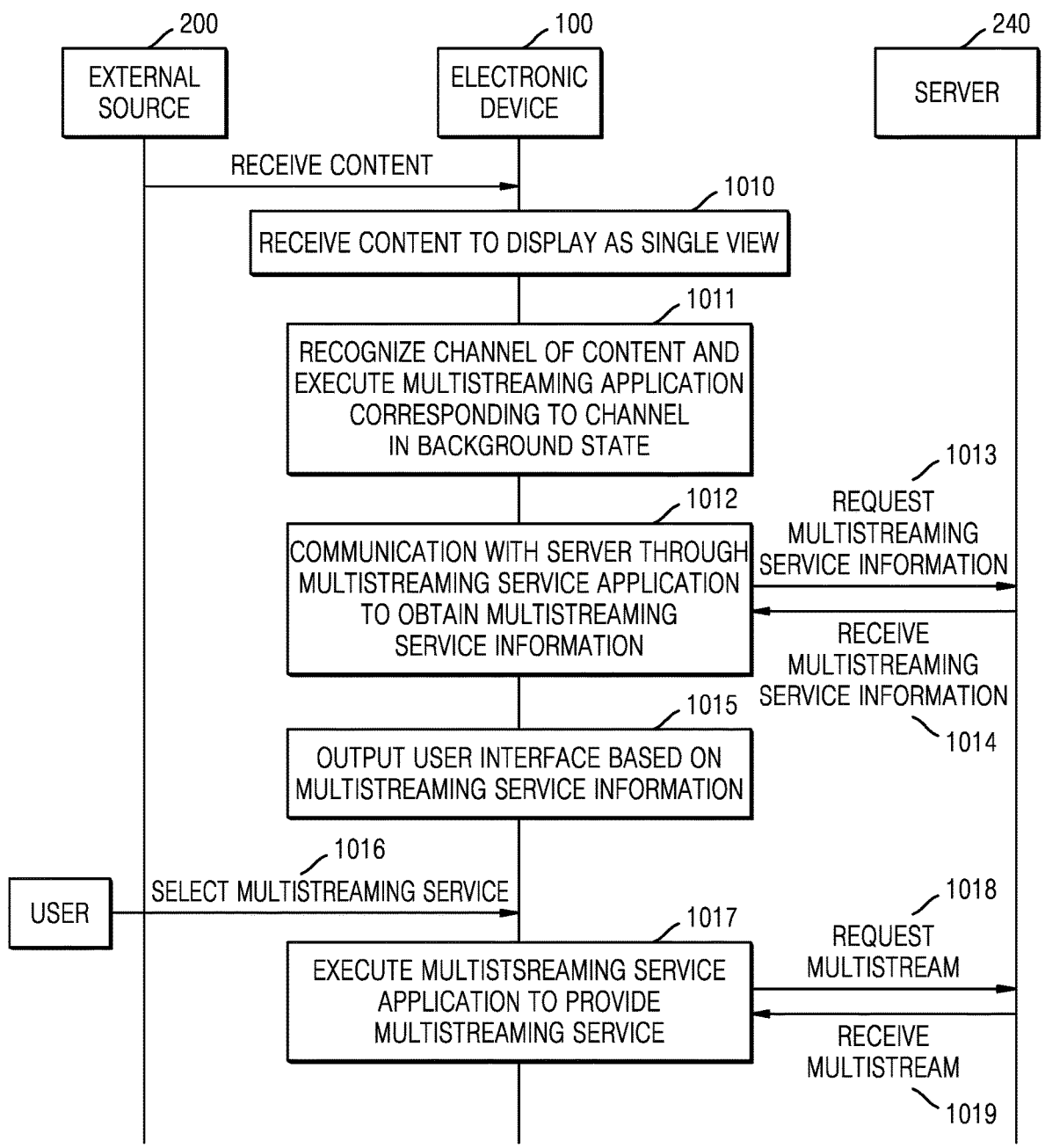

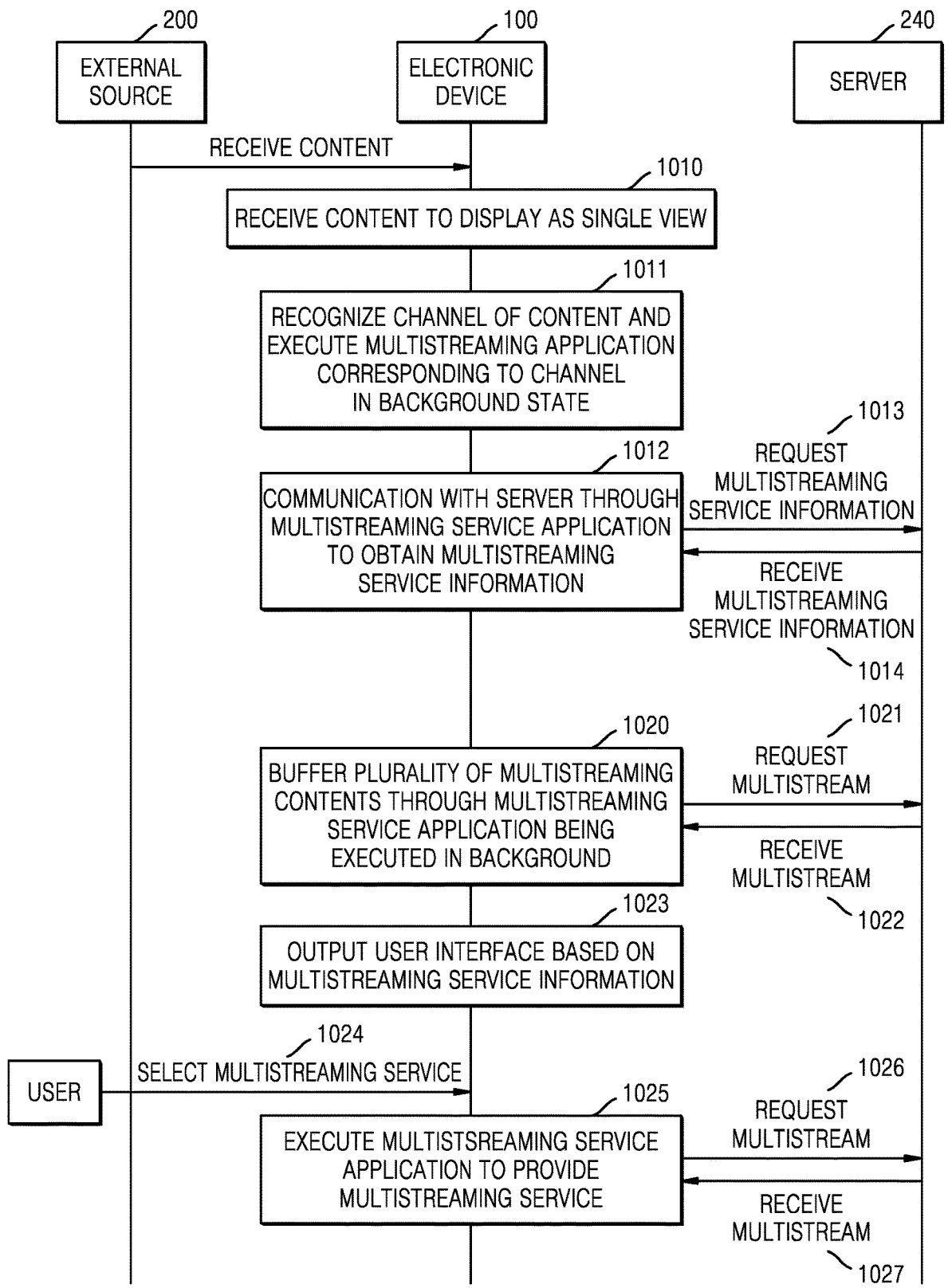

ELECTRONIC DEVICE AND METHOD FOR OPERATING SAME

CROSS-REFERENCE TO RELATED APPLICATIONS

This application is a continuation of International Application PCT/KR2021/011869, filed Sep. 2, 2021, and claims foreign priority to Korean application 10-2020-0111688, filed Sep. 2, 2020, the disclosures of which are incorporated herein by reference in their entireties.

BACKGROUND

1. Field

Various embodiments of the disclosure relate to an electronic device and a method of operating the same, and more particularly, to an electronic device capable of effectively providing a multi-streaming service and a method of operating the electronic device.

2. Description of Related Art

A display device of the related art, such as a television, usually receives one broadcasting content and displays the content on a single screen of the display device. Recently, in order to provide users with a variety of content experiences, a plurality of contents related to broadcasting content have been provided, and attempts to provide a multi-streaming service of dividing the display device into a plurality of screens and displaying different content in each of the divided plurality of screens have been made.

For the display device to display content in a single screen and then divide the single screen into a plurality of screens to display different content on each divided screen, a separate application for controlling an execution of the multi-streaming service may be required.

Therefore, efficient management of the application configured to control the execution of the multi-streaming service is required.

SUMMARY

According to an embodiment of the disclosure, an electronic device includes a memory storing one or more instructions, and a processor configured to execute the one or more instructions stored in the memory to recognize a channel providing content displayed on a display by analyzing the content displayed on the display, execute a multi-streaming service application corresponding to the recognized channel as a background, request multi-streaming service information regarding the content from a server through the multi-streaming service application, receive the multi-streaming service information in response to the request, based on the received multi-streaming service information, display a user interface notifying that a multi-streaming service regarding the content is available, and, according to a user input received in response to the user interface, activate and execute the multi-streaming service application.

According to an embodiment of the disclosure, the multi-streaming service information may include at least one of information indicating whether the multi-streaming service regarding the content is provided or information regarding a time point at which the multi-streaming service regarding the content is provided.

According to an embodiment of the disclosure, the processor may be further configured to execute the one or more instructions to identify whether the recognized channel supports the multi-streaming service, and, based on identifying that the channel supports the multi-streaming service, execute the multi-streaming service application as the background.

According to an embodiment of the disclosure, the processor may be further configured to execute the one or more instructions to, based on the time point at which the received multi-streaming service is provided, display the first user interface notifying that the multi-streaming service regarding the content is available within a predefined time before a time point at which the multi-streaming service starts.

According to an embodiment of the disclosure, the processor may be further configured to execute the one or more instructions to receive, from the server, a plurality of multi-streaming contents provided by the multi-streaming service through the multi-streaming service application executed as the background and store the plurality of multi-streaming contents in a buffer.

According to an embodiment of the disclosure, the processor may be further configured to execute the one or more instructions to, based on receiving a user input for switching the channel to another channel, maintain a background execution state of the multi-streaming service application for a preset time.

According to an embodiment of the disclosure, the processor may be further configured to execute the one or more instructions to, while displaying the content corresponding to the other channel on the display according to the user input to switch the channel, output a second user interface notifying that the multi-streaming service is available in the channel before the channel is switched.

According to an embodiment of the disclosure, the processor may be further configured to execute the one or more instructions to, according to the receiving of the user input in response to the second user interface, automatically switch the other channel to the channel.

According to an embodiment of the disclosure, the processor may be further configured to execute the one or more instructions to, according to the receiving of the user input in response to the second user interface, automatically switch the other channel to the channel and simultaneously activate the multi-streaming service application to provide a multi-view screen.

According to an embodiment of the disclosure, the processor may be further configured to execute the one or more instructions to, according to the activating and executing of the multi-streaming service application, receive the multi-streaming content from the server and provide the multi-view screen.

According to an embodiment of the disclosure, a method of operating an electronic device includes recognizing a channel providing content displayed on a display by analyzing the content displayed on the display; executing a multi-streaming service application corresponding to the recognized channel as a background; requesting multi-streaming service information regarding the content from a server through the multi-streaming service application; receiving the multi-streaming service information in response to the request; based on the received multi-streaming service information, displaying a user interface notifying that a multi-streaming service regarding the content is available; and, according to a user input received in response to the user interface, activating and executing the multi-streaming service application.

According to an embodiment of the disclosure, the multi-streaming service information may include at least one of information indicating whether the multi-streaming service regarding the content is provided or information regarding a time point at which the multi-streaming service regarding the content is provided.

According to an embodiment of the disclosure, the method may further include identifying whether the recognized channel supports the multi-streaming service; and, based on identifying that the channel supports the multi-streaming service, executing the multi-streaming service application as the background.

According to an embodiment of the disclosure, the method may further include, based on the time point at which the received multi-streaming service is provided, displaying the user interface notifying that the multi-streaming service regarding the content is available within a predefined time before a time point at which the multi-streaming service is provided.

According to an embodiment of the disclosure, a computer-readable storage medium includes one or more programs executed by a processor of an electronic device to implement a method of operating an electronic device, the method of operating the electronic device including recognizing a channel providing content displayed on a display by analyzing the content displayed on the display; executing a multi-streaming service application corresponding to the recognized channel as a background; requesting multi-streaming service information regarding the content from a server through the multi-streaming service application; receiving the multi-streaming service information in response to the request; based on the received multi-streaming service information, displaying a user interface notifying that a multi-streaming service regarding the content is available; and, according to a user input received in response to the user interface, activating and executing the multi-streaming service application.

Additional aspects will be set forth in part in the description which follows and, in part, will be apparent from the description, or may be learned by practice of the presented embodiments.

BRIEF DESCRIPTION OF DRAWINGS

The above and other aspects, features, and advantages of certain embodiments of the present disclosure will be more apparent from the following description taken in conjunction with the accompanying drawings, in which:

FIG. 10A is an example of a flowchart illustrating an operation of an electronic device, according to an embodiment of the disclosure.

FIG. 10B is an example of a flowchart illustrating an operation of an electronic device, according to an embodiment of the disclosure.

DETAILED DESCRIPTION

Figure 1:
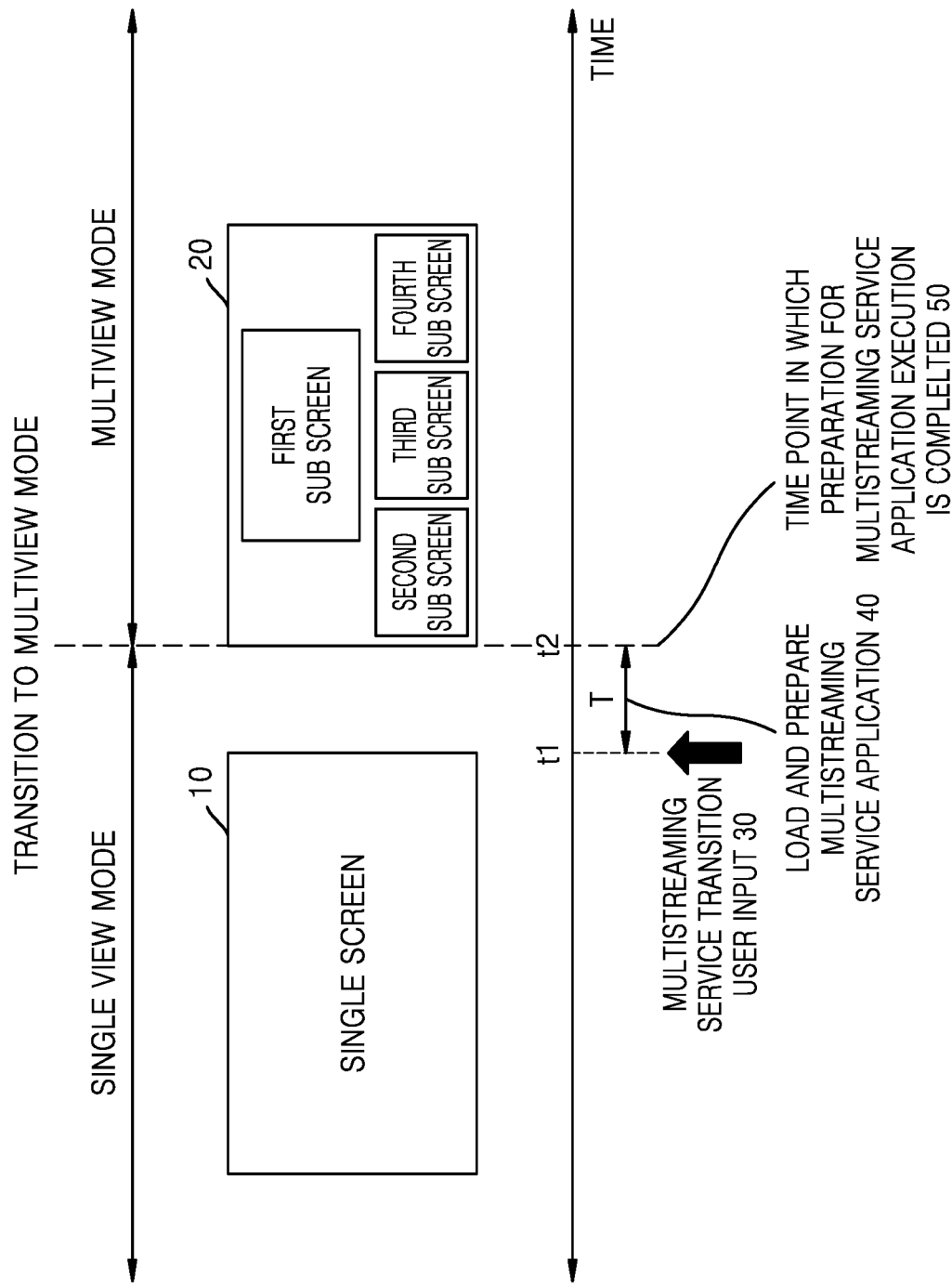
FIG. 1 is a reference diagram for explaining a single view mode, a multi-view mode, and a transition from a single view mode to a multi-view mode.

Terms used herein will be briefly described first, and the disclosure will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. In addition, terms arbitrarily selected by the applicant are used in a specific case, and in this case, its meaning will be described in the corresponding description of the disclosure. Thus, the terms used herein may be defined based on the meaning of the terms together with the description throughout the specification.

It will be understood that, throughout the specification, when a region such as an element, a component, a layer, or the like is referred to as "comprising" or "including" a component such as an element, a region, a layer, or the like, the region may further include another component in addition to the component rather than exclude the other component, unless otherwise stated. In addition, terms such as "unit" and "module" described in the specification denote a unit that processes at least one function or operation, which may be implemented in hardware or software, or implemented in a combination of hardware and software.

The disclosure will now be described more fully with reference to the accompanying drawings for one of ordinary skill in the art to be able to perform the disclosure without any difficulty. However, it should be understood that the disclosure may be embodied in different ways and is not limited to embodiments described herein. In addition, portions irrelevant to the description will be omitted from the drawings for clarity, and like components will be denoted by like reference numerals throughout the specification.

In an embodiment of the disclosure, the term "user" refers to a person who controls a function or operation of a computing device or an electronic device by using a control device, and may include viewers, administrators, or installers.

In an embodiment of the disclosure, the term "multi-streaming service" refers to a service in which a display screen of the electronic device is divided into a plurality of regions, and each divided region is used as a sub-screen, and different contents are provided on each sub-screen. The display screen may be divided into two or more sub-screens. The content provided on each sub-screen may be main content and content related to the main content. The contents provided on the sub-screens may be contents from the same source or contents from different sources. The multi-streaming service may be called a multi-view service or a multi-screen service.

In the disclosure, the expression "at least one of a, b or c" indicates "a," "b," "c," "a and b," "a and c," "b and c," "all of a, b, and c," or variations thereof. Similarly, the expression "at least one of a or b" indicates "a", "b", "all of a and b", or variations thereof.

Various embodiments of the disclosure relate to an electronic device capable of efficiently providing a multi-streaming service without any time delay when there is a multi-streaming service transition request from the user through efficient management of a multi-streaming service application, and a method of operating the electronic device.

In addition, various embodiments of the disclosure provide an electronic device capable of inducing the user to use the multi-streaming service even when a channel is switched through the management of the multi-streaming service application, and a method of operating the electronic device.

According to various embodiments of the disclosure, information regarding content displayed on a display are obtained in advance to prepare a multi-streaming service application in a background execution state, thereby providing a multi-streaming service without any time delay when a multi-streaming service request is received.

FIG. 1 is a reference diagram to explain a single view mode, a multi-view mode, and a transition from a single view mode to a multi-view mode.

Referring to FIG. 1, the single view mode 10 refers to a mode in which content is displayed on a single screen of a display in a display device such as a television. The content displayed in the single view mode 10 may include broadcasting content directly received from a broadcast station, broadcasting content received through an external source, and content received from a content providing server through the Internet.

The multi-view mode 20 may be provided for broadcasting content to provide users with a more diverse content experience. The multi-view mode 20 refers to a mode in which a display screen of the display device is divided into a plurality of screens, and different content is displayed on each divided screen. The divided screen may be called a sub-screen to be distinguished from a case in which the display consists of a single screen. Referring to FIG. 1, the multi-view mode 20 consists of a first sub-screen, a second sub-screen, a third sub-screen, and a fourth sub-screen. The size and placement of each sub-screen in the multi-view mode 20 shown in FIG. 1 is in accordance with an embodiment of the disclosure. In the multi-view mode, each sub-screen may be the same or different in size. In addition, the placement of each sub-screen in a multi-view mode 20 may be determined in various ways. In an example shown in FIG. 1, the first sub-screen, which is the main screen, is the largest in size, and the second sub-screen, the third sub-screen, and the fourth sub-screen are smaller than the first sub-screen and are located below the first sub-screen. However, the placement of the sub-screens may be determined in various ways and, for example, the size of the sub-screens may be determined to be the same.

The display mode of the display device may be displayed in the single view mode and then be transitioned to the multi-view mode. When content is displayed in the single view mode and transitioned to the multi-view mode, the content displayed in the multi-view mode 20 may be content related to the content shown in the single view mode. For example, in sports content such as baseball, the contents displayed on the plurality of sub-screens in the multi-view mode 20 may be contents corresponding to a plurality of scenes that may be obtained in the corresponding sports content. For example, each sub-screen of the multi-view mode 20 may display content centered on a batter, content centered on a catcher, content centered on a coach, and content centered on an audience. For example, in a case of content that relays a performance, each sub-screen of the multi-view mode 20 may display the content of each performer who acts or plays in the performance.

The content displayed in the multi-view mode 20 may include content that provides additional information regarding the content displayed in the single view mode. For example, the additional information regarding the content in a baseball game broadcast may include scores of baseball games, information about teams, and information about baseball players, and a performance relay broadcast may include information about performers and information about performances.

When the display device displays in the single view mode and then transitions to the multi-view mode, the display device takes time to load and prepare an application for transitioning to and displaying in the multi-view mode. In the single view mode, the display device may receive the broadcast content by using a tuner or an external source such as a set top box through an HDMI interface. To receive a plurality of simultaneous content streams in the multi-view mode, the display device needs to execute an application for preparing to receive a plurality of content streams by accessing a content server through the Internet, and the execution of such an application takes a lot of time. Therefore, there may be a time difference between a user input time point and an actual multi-view mode-providing time point, thereby inhibiting content to be provided in the multi-view mode 20 at a time point at which the user input is received. For example, referring to FIG. 1, although a multi-streaming service transition user input 30 is received at t1, the display device may take as long as "T" for loading and preparing a multi-streaming service application 40. Therefore, the display device may start to execute the multi-streaming service application and provide the multi-view mode 20 at a time point t2, which is when preparation for executing the multi-view mode 20 is finished 50.

The disclosure provides a method of executing and managing the multi-streaming service application in advance to minimize or reduce a time delay that may occur when transitioning from the single view mode to the multi-view mode.

Figure 2:
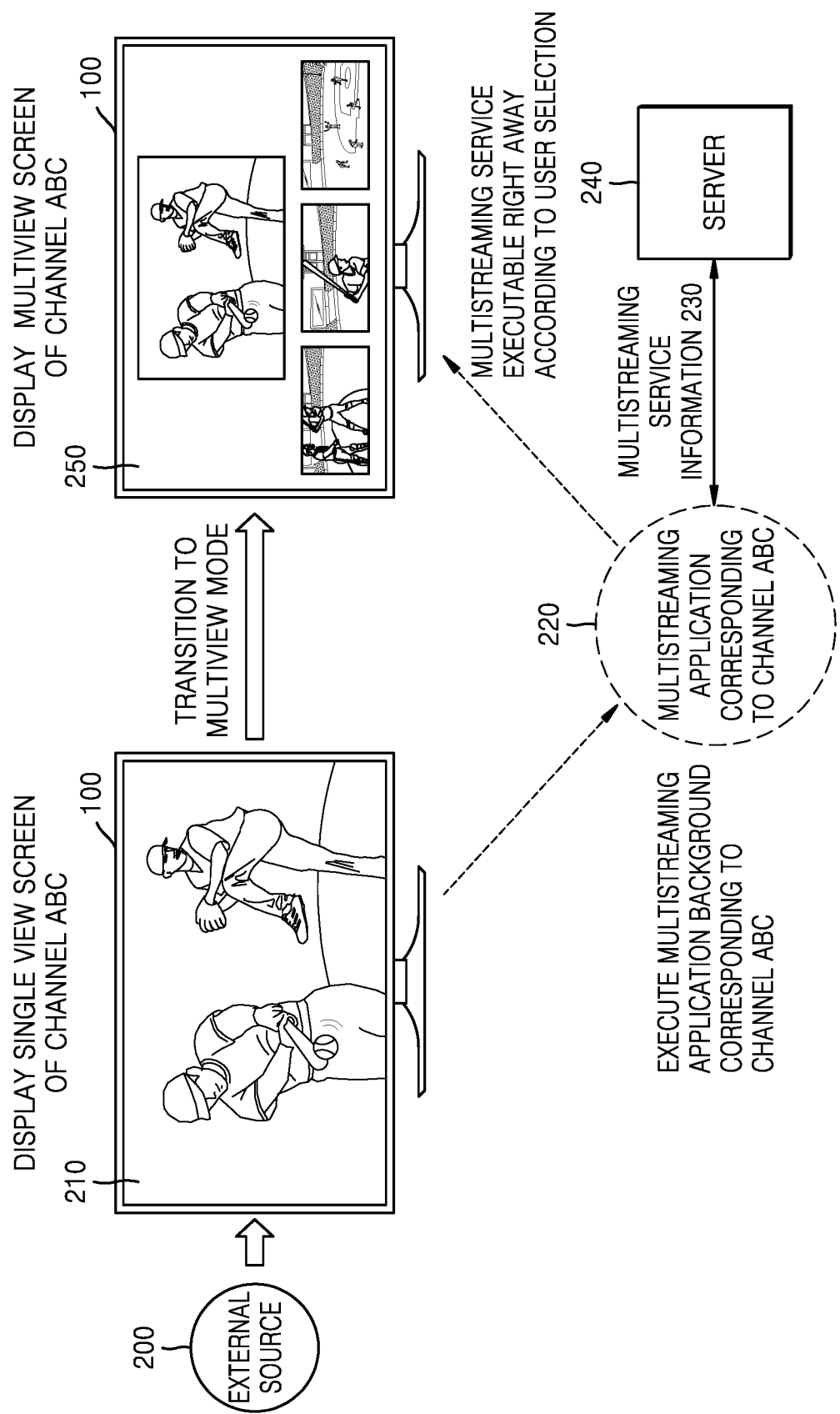
FIG. 2 is a reference diagram for explaining a method of providing a multi-streaming service in an electronic device, according to an embodiment of the disclosure.

FIG. 2 is a reference diagram for explaining a method of providing a multi-streaming service in an electronic device 100 according to an embodiment of the disclosure.

Referring to FIG. 2, the electronic device 100 according to an embodiment of the disclosure may display content 210 provided from a channel ABC from an external source 200 on a single view screen.

According to an embodiment, the electronic device 100 may recognize a channel that provides the content 210 displayed on a current display by analyzing the content 210 displayed on the display. For example, the electronic device 100 may recognize that the channel ABC provides the content displayed on the display.

According to an embodiment of the disclosure, as the channel of the content displayed on the display is recognized, the electronic device 100 may execute, as a background, the multi-streaming service application 220 corresponding to the recognized channel. The multi-streaming service application refers to an application that allows receiving multi-streaming content by communicating with the server and displaying the received multi-streaming content on a plurality of sub-screens. Executing the multi-streaming service application as a background refers to preparing the multi-streaming service application to be in a state of being able to communicate with the server by loading and then executing the multi-streaming service application on a memory. In a background state, an execution screen of the multi-streaming service application is not rendered.

According to an embodiment of the disclosure, the electronic device 100 may, as the channel of the content displayed on the display is recognized, identify whether the multi-streaming service application related to the recognized channel is installed, and when the multi-streaming service application is installed, may control the multi-streaming service application to operate as the background. According to an embodiment of the disclosure, when, as a result of identifying whether the multi-streaming service application related to the recognized channel is installed, the multi-streaming service application is not installed, the electronic device 100 may output a user interface inducing installation of the multi-streaming service application. When the user selects to install the multi-streaming service application according to the user interface, the electronic device 100 may download the multi-streaming service application from the server and then install the multi-streaming service application, and control the installed multi-streaming service application to operate as the background.

The multi-streaming service application 220 executed as the background may communicate with the server 240, thereby obtaining multi-streaming service information 230 related to the currently displayed content 210. The multi-streaming service information 230 may include at least one of information indicating whether providing a multi-streaming service related to the corresponding content is possible or, when the multi-streaming service is provided, information regarding a time point at which the multi-streaming service is provided.

In case that the multi-streaming service information 230 according to an embodiment of the disclosure indicates that the multi-streaming service related to the content is to be provided, in addition to the information regarding a time point at which the multi-streaming service related to the content is provided, the multi-streaming service information 230 may include information regarding the plurality of content streams provided by the multi-streaming service. Information regarding the plurality of content streams provided by the multi-streaming service may include at least one of a resolution of each content stream, minimum bandwidth and maximum bandwidth, or location information on a network such as a URL (universal resource locator).

The electronic device 100 according to an embodiment of the disclosure may request the plurality of content streams provided by the multi-streaming service from the server and store them in a buffer within a predefined time before the multi-streaming service is provided, based on information regarding a time point at which the multi-streaming service received through the multi-streaming service application 220 executed as the background is provided. For example, the electronic device 100 may request the plurality of content streams provided by the multi-streaming service from the server 240 by using location information on the network such as the URL received from the server 240, receive the plurality of content streams provided by the multi-streaming service from the server 240, and store the plurality of content streams in the buffer. For example, a buffer may store seconds to tens of seconds of content streams.

According to an embodiment of the disclosure, the electronic device 100 may start receiving the plurality of content streams provided by the multi-streaming service in response to the user input of selecting the multi-streaming service.

According to an embodiment of the disclosure, the electronic device 100 may output a user interface that notifies that a multi-streaming service regarding the content 210 is to be provided based on the multi-streaming service information received through the multi-streaming service application 220 executed as the background. For example, the electronic device 100 may output a user interface that notifies that the multi-streaming service is to be provided when the time point at which the multi-streaming service is provided approaches.

According to an embodiment of the disclosure, when the user input of selecting the multi-streaming service is received from the user in response to the user interface notifying that the multi-streaming service is to be provided, the electronic device 100 may control the multi-streaming service application in the background execution state to be activated to a foreground execution state. Accordingly, the multi-streaming service application may display the multi-streaming content 250 received from the server 240 while operating as the background on the multi-view screen, that is, each of the plurality of sub-screens, of the display of the electronic device 100. Alternatively, the electronic device 100 may start receiving the multi-streaming content 250 according to the user input of selecting the multi-streaming service, and may display the received multi-streaming content 250 on the multi-view screen, that is, each of the plurality of sub-screens, of the display of the electronic device 100. Because the multi-streaming service application is already in a background execution state at a time point at which the user input of selecting the multi-streaming service is received, a time for transitioning the multi-view screen may be minimized or reduced because the electronic device 100 only needs to transition the multi-streaming service application in the background execution state to a foreground execution state.

According to an embodiment of the disclosure, in a state in which the multi-streaming service application corresponding to the channel ABC is loaded and executed, even when a channel switching is made according to the user input, the electronic device 100 may maintain an execution state of the multi-streaming service application for a predefined time. For example, the electronic device 100 may immediately provide the multi-view screen of the channel ABC when the input for switching from the channel DEF to the channel ABC is received from the user by maintaining the execution state of the multi-streaming service application corresponding to the channel ABC for a predefined time even when content from the channel DEF is being displayed according to the user input of switching from the channel ABC to the channel DEF.

According to an embodiment of the disclosure, after the multi-streaming service application corresponding to the channel ABC is loaded and executed, even when a channel switching is made according to the user input, not only may the electronic device 100 maintain the execution of the multi-streaming service application for a predefined period, but may also output a notifying message indicating that the multi-streaming service is to be provided in the previous channel. For example, according to the user input of switching from the channel ABC to the channel DEF, the electronic device 100 may, even when the content from the channel DEF is being displayed, maintain the multi-streaming service application corresponding to the channel ABC in an execution state and, at the same time, output the user interface notifying that the multi-streaming service is provided from the channel ABC, thereby inducing the user to experience the multi-streaming service.

According to an embodiment of the disclosure, the electronic device 100 may, as the channel of the content displayed on the display is recognized, identify whether the recognized channel provides the multi-streaming service by analyzing the content displayed on the display, and execute the multi-streaming service application as the background in advance according to an identified result.

According to an embodiment of the disclosure, the electronic device 100 may manage a table including location information for finding multi-streaming service information regarding each channel of one or more channels, and the electronic device 100 may use the table to analyze the content currently displayed on the display, thereby obtaining the multi-streaming service information of the corresponding channel.

According to an embodiment of the disclosure, the electronic device 100 may include a detector corresponding to each channel of the one or more channels, and may obtain the multi-streaming service information of the corresponding channel from the currently displayed content by using each detector.

Figure 3:
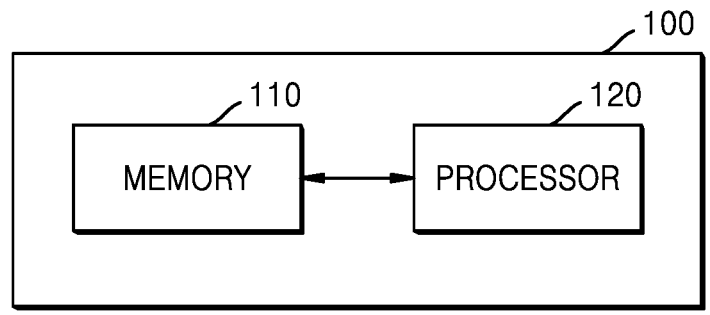
FIG. 3 is a schematic block diagram illustrating an electronic device according to an embodiment of the disclosure.

FIG. 3 is a schematic block diagram illustrating the electronic device according to an embodiment of the disclosure.

Referring to FIG. 3, the electronic device 100 may include a memory 110 and a processor 120. However, the electronic device 100 may be implemented with more components than the illustrated components, and is not limited to the example described above.

According to an embodiment of the disclosure, the memory 110 may store programs for a processing and controlling operation of the processor 120 and may store data input to the electronic device 100 or output from the electronic device 100.

The memory 110 may include at least one type of storage medium, from among a flash memory type storage medium, a hard disk type storage medium, a multi-media card micro type storage medium, a card type memory (for example, an SD or an XD memory), random-access memory (RAM), static RAM (SRAM), read-only memory (ROM), electrically erasable programmable ROM (EEPROM), programmable ROM (PROM), a magnetic memory, a magnetic disk, or an optical disk.

The processor 120 may control the overall operation of the electronic device 100. For example, the processor 120 may perform a function of the electronic device 100 of the disclosure by executing one or more instructions stored in the memory 110.

According to an embodiment of the disclosure, the processor 120 may execute one or more instructors stored in the memory 110 to control the electronic device 100 to perform the operations described above. In this case, the memory 110 may store one or more instructions executable by the processor 120.

In addition, according to an embodiment of the disclosure, the processor 120 may store one or more instructions in an inner memory and execute the one or more instructions stored in the inner memory to control the electronic device 100 to perform the operations described above. That is, the processor 120 may perform a predefined operation by executing at least one instruction or program stored in the internal memory provided inside the processor 120 or the memory 110.

In addition, FIG. 3 illustrates one processor 120, but a plurality of processors (not shown) may be provided. In this case, each operation performed in the electronic device according to an embodiment of the disclosure may be performed through at least one of the plurality of processors.

By executing at least one instruction stored in the memory 110, the processor 120 according to an embodiment of the disclosure may recognize the channel providing content by analyzing the content displayed on the display, execute the multi-streaming service application corresponding to the recognized channel as the background, request multi-streaming service information regarding the content from the server through the multi-streaming service application, receive the multi-streaming service information in response to the request, display a user interface notifying that the multi-streaming service regarding the content is available based on the received multi-streaming service information, and activate and execute the multi-streaming service application according to a user input received in response to the user interface.

The multi-streaming service information according to an embodiment of the disclosure may include at least one of information indicating whether the multi-streaming service regarding the content is provided or information regarding a time point at which the multi-streaming service regarding the content is provided.

By executing at least one instruction stored in the memory 110, the processor 120 according to an embodiment of the disclosure may identify whether the recognized channel supports the multi-streaming service, and, based on identifying that the channel supports the multi-streaming service, may execute the multi-streaming service application as the background.

By executing the one or more instructions stored in the memory 110, the processor 120 according to an embodiment of the disclosure may display a user interface notifying that the multi-streaming service is already available regarding the content within a predefined time before a time point at which the multi-streaming service is provided, based on information regarding the time point at which the received multi-streaming service is provided.

By executing the one or more instructions stored in the memory 110, the processor 120 according to an embodiment of the disclosure may, maintain the background execution state of the multi-streaming service application fora predetermined time after receiving a user input of switching the channel to another channel.

By executing the one or more instructions stored in the memory 110, the processor 120 according to an embodiment of the disclosure may, while displaying content corresponding to another channel on the display, output a user interface notifying that the multi-streaming service is available in the channel before the channel is switched according to a user input regarding channel switching.

By executing the one or more instructions stored in the memory 110, the processor 120 according to an embodiment of the disclosure may automatically switch the other channel to the channel upon receiving a user input in response to the user interface.

By executing the one or more instructions stored in the memory 110, the processor 120 according to an embodiment of the disclosure may activate the multi-streaming service application to provide a multi-view screen simultaneously with automatically switching the other channel to the channel upon receiving the user input in response to the user interface.

By executing the one or more instructions stored in the memory 110, the processor 120 according to an embodiment of the disclosure may receive multi-streaming content from the server and provide a multi-view screen as the multi-streaming service application is activated and executed.

The electronic device 100 may be any type of device that performs functions, including a processor and a memory. The electronic device 100 may be a stationary or mobile device. For example, the electronic device 100 may include a variety of electronic devices such as desktops, laptops, computers such as tablets, televisions, set-top boxes, smartphones, cellular phones, game players, music players, video players, medical equipment, and home appliances. The electronic device 100 may also be called a display device, a computing device, and a media device.

Figure 4:
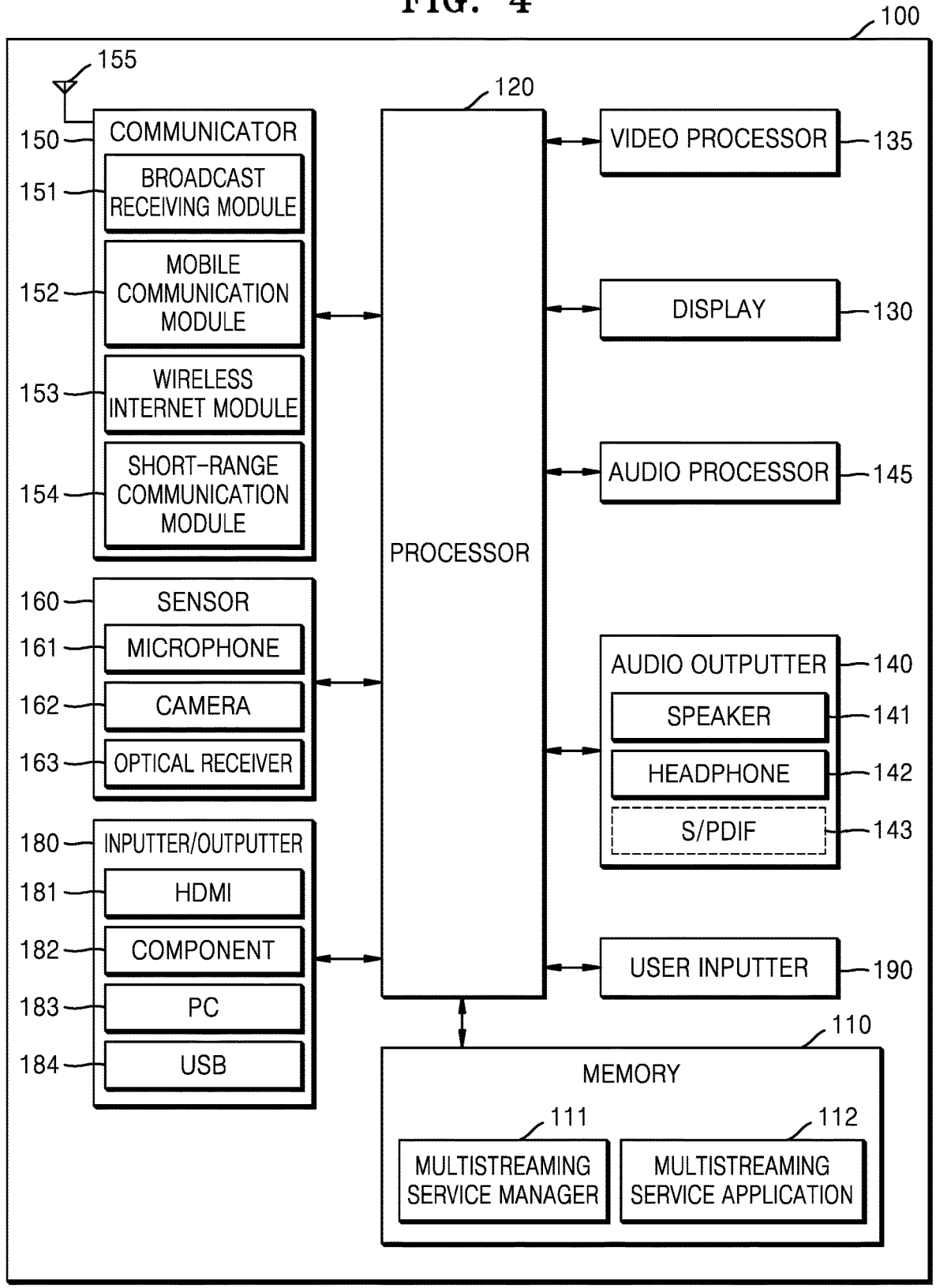
FIG. 4 is a detailed block diagram illustrating an electronic device according to an embodiment of the disclosure.

FIG. 4 is a detailed block diagram illustrating the electronic device according to an embodiment of the disclosure.

In FIG. 4, configurations that are identical to those of FIG. 3 are shown using the same reference numbers. Therefore, in description of the electronic device 100, redundant descriptions in FIG. 3 are omitted.

Referring to FIG. 4, the electronic device 100 may further include a display 130, a video processor 135, and audio processor 145, an audio outputter 140, a communicator 150, an antenna 155, a sensor 160, and inputter/outputter 180, and a user inputter 190, in addition to the memory 110 and the processor 120. The processor 120 may control each component of the electronic device 100 to perform operations.

Regarding the memory 110 and the processor 120, redundant descriptions in FIG. 3 are omitted in the description of FIG. 4.

The display 130 may display an image on a screen by control by the processor 120. The image displayed on the screen may be received from the communicator 150, the inputter/outputter 180, and the memory 110.

The video processor 135 may process image data to be displayed by the display 130, and perform various image processing operations such as decoding, rendering, scaling, noise filtering, frame rate conversion, and resolution conversion.

According to an embodiment of the disclosure, the video processor 135 may process a screen of the display 130 into a single view screen to display one video content.

According to an embodiment of the disclosure, the video processor 135 may process a screen of the display 130 into a multi-view screen to display different video contents on a plurality of sub-screens. The video processor 135 capable of configuring a multi-view screen will be described in detail with reference to FIG. 5.

The audio processor 145 may perform the processing of audio data. In the audio processor 145, various processing such as decoding, amplification, and noise filtering of audio data may be performed.

The audio outputter 140 may output an audio included in a broadcast signal received through the control by the processor 120, an audio input through the communicator 150 or the inputter/outputter 180, and an audio stored in the memory 110. The audio outputter 140 may include at least one of a speaker 141, a headphone output terminal 142, or a Sony/Philips Digital Interface (S/PDIF): output terminal 143.

The transmitting/receiving antenna 155 may receive a signal sent by other devices or transmit the signal to the other devices. Although one transmitting/receiving antenna 155 is shown, a Multiple Input Multiple Output (MIMO) system may be supported by preparing a plurality of antennas.

The communicator 150 may include one or more modules that enable wireless communication between the electronic device 100 and a wireless communication system or the electronic device 100 and a network in which another electronic device is located. For example, the communicator 150 may include a broadcast receiving module 151, a mobile communication module 152, a wireless Internet module 153, and a short-range communication module 154. The communicator 150 may be called a transmitter/receiver.

The broadcast receiving module 151 may receive a broadcast signal and/or broadcasting-related information from an external broadcasting management server through broadcasting channels. The broadcast signal may not only include TV broadcast signals, radio broadcast signals, and data broadcast signals, but also include broadcast signals in which TV broadcast signals or radio broadcast signals are combined with data broadcast signals.

The mobile communication module 152 may transmit and receive a wireless signal to and from at least one of a base station, an external terminal, or a server on a mobile communication network. The wireless signal may include various types of data according to exchange of a voice call signal, an image call signal, or a text/multimedia message.

The wireless Internet module 153 refers to a module for wireless internet access, which may be embedded in or external to the device. Wireless LAN (WLAN), Wi-Fi, wireless broadband (Wibro), world interoperability for microwave access (Wimax), high speed downlink packet access (HSDPA), etc. may be used as wireless Internet technology. Through the wireless Internet module 153, the device may be in Wi-Fi Peer to Peer (P2P) connection with another device.

According to an embodiment of the disclosure, according to the control by the processor 120, the multi-streaming service application may receive the multi-streaming service information by communicating with the server through the wireless Internet module 153.

According to an embodiment of the disclosure, according to the control by the processor 120, the multi-streaming service application may receive the multi-streaming content to be displayed on the multi-view screen by communicating with the server through the wireless Internet module 153.

The short-range communication module 154 refers to a module for short-range communication. Bluetooth, radio frequency identification (RFID), infrared data association (IrDA), ultra wideband (UWB), Zigbee, etc. may be used as short-range communication technology.

The sensor 160 may detect a voice of the user, an image of the user, or an interaction of the user, and may include a microphone 161, a camera 162, and an optical receiver 163.

The microphone 161 may receive an uttered voice of the user. The microphone 161 may convert a received voice into an electrical signal and output to the processor 120.

According to an embodiment of the disclosure, the microphone 161 may receive a voice command of the user to control a magic hand function by the control by the processor 120 and deliver the voice command to the processor 120.

The camera 162 may receive an image (e.g., a continuous frame) corresponding to the user's motion including a gesture in a camera recognition range.

According to an embodiment of the disclosure, the camera 162 may detect a gesture of the user controlling the magic hand by the control by the processor 120, and may transmit a signal corresponding to the detected gesture to the processor 120.

The optical receiver 163 may receive an optical signal (including a control signal) received from a remote control device. The optical receiver 163 may receive an optical signal corresponding to a user input (e.g., touch, pressing, touch gesture, voice, or motion) from the remote control device. A control signal may be extracted from the received optical signal by the control by the processor 120.

The inputter/outputter 180 may receive a video (e.g., moving image, etc.), an audio (e.g., voice, music, etc.), and additional information (e.g., EPG, etc.) from outside the electronic device 100 by the control by the processor 120. The inputter/outputter 180 may include one of a high-definition multimedia interface (HDMI) port 181, a component jack 182, a PC port 183, and a USB port 184. The inputter/outputter 180 may include a combination of a HDMI port 181, a component jack 182, a PC port 183, and a USB port 184.

According to an embodiment of the disclosure, according to the control by the processor 120, the HDMI port 181 may receive broadcast content from the set-top box or a content providing device.

The user inputter 190 refers to a device used by a user to input data to control the electronic device 100. For example, the user inputter 190 may include, but is not limited to, a key pad, a dome switch, a touchpad, a jog wheel, and a jog switch.

According to an embodiment of the disclosure, the memory 110 may store programs for a processing and controlling operation of the processor 120 and may store data input to the electronic device 100 or output from the electronic device 100. In addition, the memory 110 may store data necessary for the operation of the electronic device 100.

In addition, programs stored in memory 110 may be classified into a plurality of modules according to each function.

According to an embodiment of the disclosure, the memory 110 may include a multi-streaming service manager 111 and multi-streaming service application 112 corresponding to a channel. The multi-streaming service manager 111 may perform a function of recognizing the channel of the content displayed on the display to provide the multi-streaming service in the display device 100 and controlling or managing the multi-streaming service application corresponding to the recognized channel. The multi-streaming service application 112, which is an application provided correspondingly to each channel, may perform a function of communicating with the server to provide the multi-streaming service, thereby receiving control information from the server or multi-streaming content from the server and displaying the received content on the multi-view screen. The multi-streaming service manager 111 and the multi-streaming service application 112 corresponding to the channel are described in detail with reference to FIGS. 7 and 8.

In FIG. 4, the multi-streaming service manager 111 and the multi-streaming service application 112 corresponding to the channel are implemented as software stored in the memory 110, and may be implemented as, but is not limited to, a combination of suitable software, logic, circuitry, interface, and/or code that may be operable to perform the multi-streaming service function according to an embodiment of the disclosure.

The memory 110 may download and store the service manager 111 and the multi-streaming service application 112 corresponding to the channel from the server by the control by the processor 120.

The processor 120 may control an overall operation of the electronic device 100 and a signal flow between internal components of the electronic device 100, and perform a data processing function. When there is a user input or when the previously set stored condition is satisfied, the processor 120 may execute an operation system (OS) and various applications stored in the memory 110.

Also, the processor 120 may include an inner memory. In this case, at least one of data, program, or instruction stored in the memory 110 may be stored in the inner memory (not shown) of the processor 120.

Meanwhile, the block diagrams of the electronic device 100 of FIGS. 3 and 4 are block diagrams according to embodiments of the disclosure. Components of the block diagram may be integrated, a component may be added, or a component may be omitted according to the specification of the electronic device 100 that is actually implemented. For example, two or more components may be integrated into one component or one component may be divided into two or more components when necessary. In addition, a function performed by each block is for describing embodiments of the disclosure, and a particular operation or device does not limit the scope of the disclosure.

Figure 5:
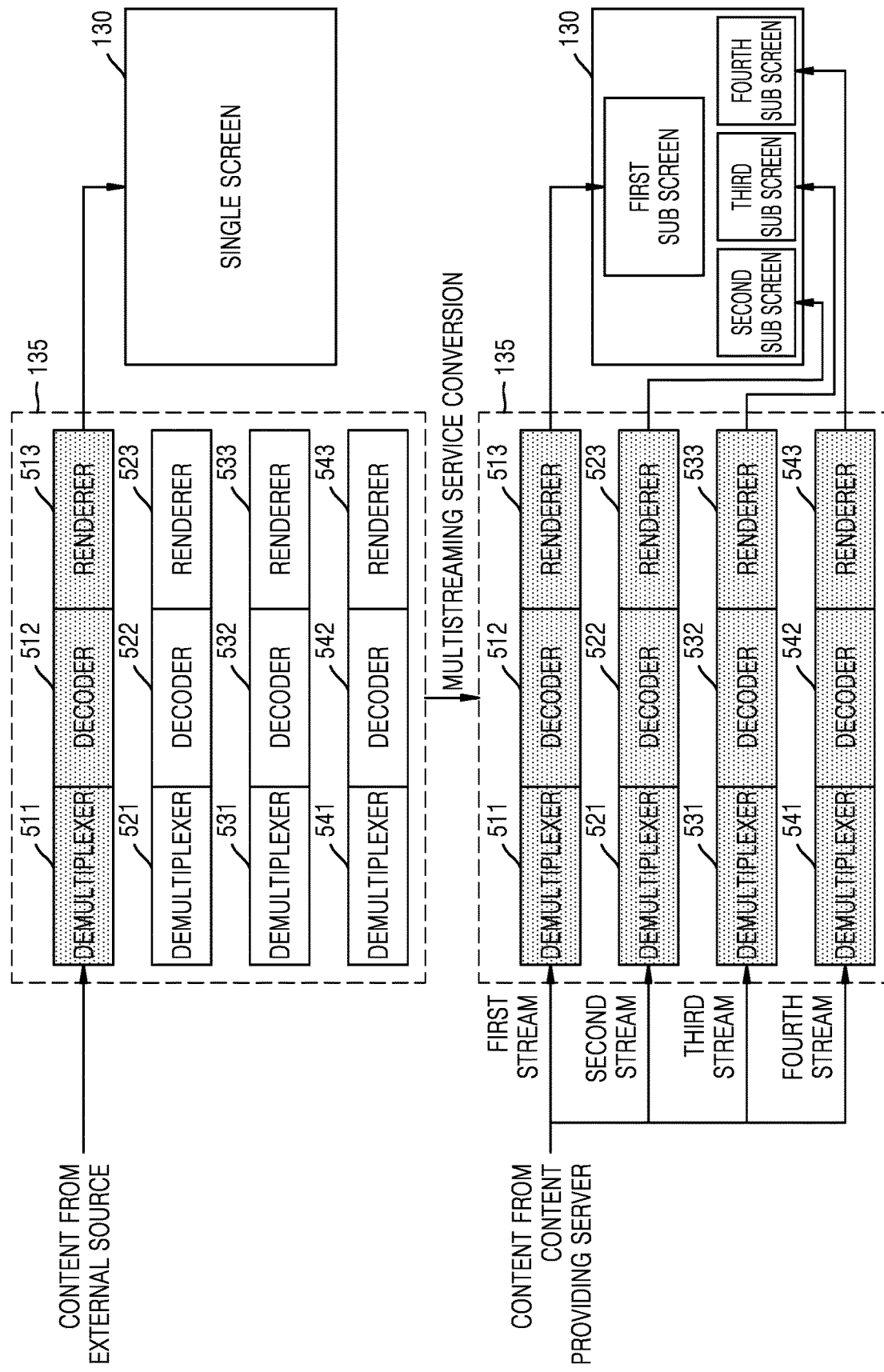
FIG. 5 is an example of a configuration of a video processor for providing a multi-view screen according to an embodiment of the disclosure.

FIG. 5 is an example of a configuration of the video processor for providing a multi-view screen according to an embodiment of the disclosure.

The content stream received by the electronic device 100 may be displayed on the display 130 through demultiplexing, decoding, and rendering by the video processor 135. A scaling process (not shown) may further be included after the rendering process.

The demultiplexing process refers to parsing of the content streams and separating multiplexed streams. The demultiplexing process may be implemented in hardware resources or software resources.

The decoding process refers to decoding a demultiplexed stream, and the decoding process may be implemented in hardware resources or software resources.

The rendering process refers to configuring a decoded stream as a screen image that may be displayed on the display 130. The rendering process may be implemented in hardware resources or software resources.

The scaling process refers to adjusting decoded data or rendered data to the characteristics of the display 130. The scaling process may be implemented in hardware resources or software resources. The rendering process and the scaling process may be integrated into one process, or the scaling process may be omitted.

A demultiplexer, a decoder, and a renderer, three in number, may be called a reproduction pipeline that reproduces a single content. The embodiments of the disclosure may include a plurality of reproduction pipelines to display different plurality of contents on a plurality of sub-screens.

Referring to FIG. 5, the video processing unit 135 may include a plurality of reproduction pipelines, for example, four reproduction pipelines.

The video processor 135 may include a first reproduction pipeline consisting of a dimultiflexer 511, a decoder 512, and a renderer 513, a second reproduction pipeline consisting of a dimultiflexer 521, a decoder 522, and a renderer 523, a third reproduction pipeline consisting of a dimultiflexer 531, a decoder 532, and a renderer 533, and a fourth reproduction pipeline consisting of a dimultiflexer 541, a decoder 542, and a renderer 543.

In a mode in which the display displays one content on a single view screen, the video processor 135 may receive content from an external source, for example, and process the content through the first reproduction pipeline. The processed content may be provided with as a single view screen.

In a mode in which the display displays a plurality of contents on the single view screen, the video processor 135 may receive the plurality of content streams from a content providing server and may process the received content streams through a maximum number of four reproduction pipelines. The content processed in each reproduction pipeline may be provided on each sub-screen of the multi-view screen.

In the example shown in FIG. 5, the video processor 135 is shown to include four reproduction pipelines, but is merely an example. More or less reproduction pipelines may be included.

In the single view mode, the electronic device 100 may process the content through one reproduction pipeline, and, when there is a multi-streaming service transition request, a plurality of content streams may be processed through reproduction pipelines as much as the number of multi-view screens provided by the multi-streaming service.

To provide the multi-streaming service in the electronic device 100, as shown in FIG. 5, hardware/software requirements capable of processing the multi-streaming content needs to be satisfied. That is, even if content or a channel provides the multi-streaming service, the multi-streaming service may be provided when the electronic device 100 has a performance for handling such a multi-streaming content. Therefore, it may be appropriate for a user interface notifying that the multi-streaming service is available to be provided by the electronic device 100 than by the channel or channel content, considering the multi-streaming content processing performance of the electronic device 100 itself.

Figure 6:
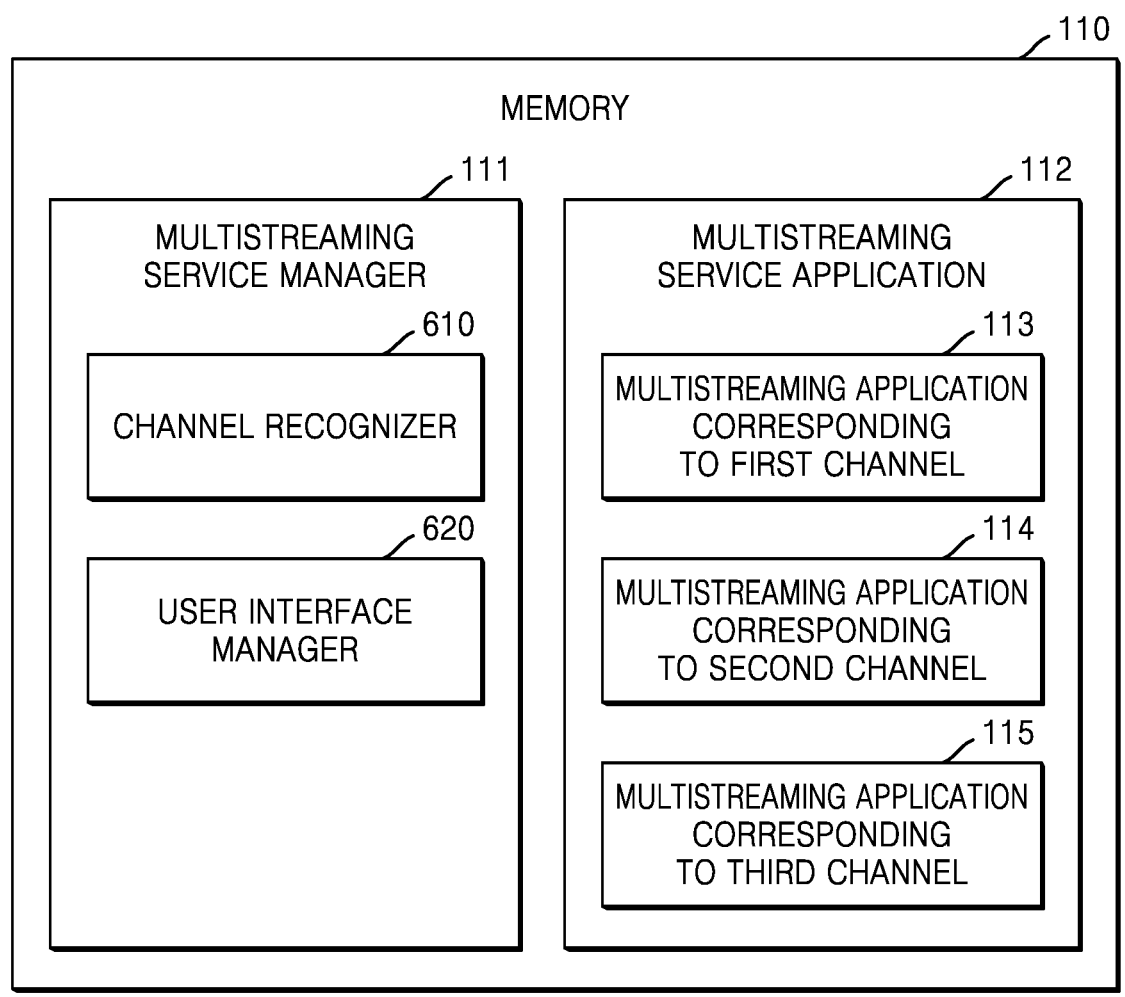
FIG. 6 is an example of a memory configuration for providing a multi-streaming service function according to an embodiment of the disclosure.

FIG. 6 is an example of a memory configuration for providing the multi-streaming service function according to an embodiment of the disclosure.

Referring to FIG. 6, the memory 110 according to an embodiment of the disclosure may include the multi-streaming service manager 111 and the multi-streaming service application 112.

The multi-streaming service application 112 may include the multi-streaming service application corresponding to each channel for the one or more channels. For example, in FIG. 6, the multi-streaming service application 112 includes a multi-streaming application corresponding to a first channel 113, a multi-streaming application corresponding to a second channel 114, and a multi-streaming application corresponding to a third channel 115.

Each channel-corresponding multi-streaming service application may be executed in the background state or the foreground state according to the control by the multi-streaming service manager 111. When the multi-streaming service application is executed in the background state, the multi-streaming service application may execute functions of performing communication with the server, but may not be displayed on the display of the electronic device because an actual screen is not rendered. When the multi-streaming service application is executed in the foreground state, the multi-streaming service application may be completely activated to render the execution screen and thus be displayed on the display of the electronic device.

According to the control by the multi-streaming service manager 111, the multi-streaming service application executed in the background state may communicate with the server, thereby being able to receive the multi-streaming service information regarding the currently displayed content. The multi-streaming service information may include at least one of information indicating whether multi-streaming service related to the corresponding content is to be provided or, when the multi-streaming service is provided, information regarding a time point at which the multi-streaming service is provided. According to an embodiment of the disclosure, when the multi-streaming service information received in response to the multi-streaming service information request indicates that the multi-streaming service related to the content is to be provided, in addition to information regarding a time point at which the multi-streaming service regarding the content is provided, information regarding a plurality of content streams provided by the multi-streaming service may be included. Information regarding the plurality of content streams provided by the multi-streaming service may include at least one of a resolution of each content stream, minimum bandwidth and maximum bandwidth, or location information on a network such as a URL (universal resource locator).

The multi-streaming service application executed as the background state according to the control by the multi-streaming service manager 111 may communicate with the server, thereby requesting the plurality of content streams provided by the multi-streaming service from the server to store the plurality of content streams in the buffer. For example, the multi-streaming service application may request the plurality of content streams provided by the multi-streaming service from the server by using location information on the network such as the URL received from the server, receive the plurality of content streams provided by the multi-streaming service from the server, and store the plurality of content streams in the buffer.

The multi-streaming service application executed in the foreground state according to the control by the multi-streaming service manager 111 may receive the multi-streaming content regarding the currently displayed content by communicating with the server, and may perform processing for displaying the received multi-streaming content on each of the plurality of sub-screens.

The multi-streaming service manager 111 may include a channel recognizer 610 and a user interface manager 620.

The channel recognizer 610 may recognize the channel providing the content that is currently displayed by analyzing the content displayed on the screen of the current display 130. For example, the channel recognizer 610 may obtain information about the channel from the content by analyzing the content by using optical character recognition (OCR), automatic content recognition (ACR), etc.

The channel recognizer 610 according to an embodiment of the disclosure may, when the channel of the currently displayed content is recognized, identify whether a multi-streaming application corresponding to the recognized channel exists, and when the multi-streaming application exists, may activate the multi-streaming application corresponding to the channel to be executed in the background state. For example, when the channel recognized by the channel recognizer 610 is the first channel, the channel recognizer 610 may activate the multi-streaming application corresponding to the first channel 113 to be executed in the background state. The channel recognizer 610 may control the corresponding multi-streaming service application to be executed in the background state when there is a multi-streaming service application corresponding to the recognized channel regardless of whether the multi-streaming service is provided for the currently displayed content.

According to an embodiment of the disclosure, when, as a result of identifying whether the multi-streaming service application related to the recognized channel is installed, the multi-streaming service application is not installed, the user interface manager 620 may output a user interface inducing installation of the multi-streaming service application. When the user selects to install the multi-streaming service application according to the user interface, the user interface manager 620 may download the multi-streaming service application from the server and then install the multi-streaming service application, and control the installed multi-streaming service application to operate as the background.

According to an embodiment of the disclosure, the user interface manager 620 may perform functions of receiving the multi-streaming service information from the multi-streaming application executed in the background state, and, based on the multi-streaming service information, generating and outputting a user interface notifying that the multi-streaming service is available for the currently displayed content. The user interface manager 620 may perform functions of generating and outputting the user interface notifying that the multi-streaming service is available, based on the multi-streaming service providing time point included in the received multi-streaming service information. According to the user input of selecting the multi-streaming service function in response to the output user interface, the user interface manager 620 may control the multi-streaming service application being executed in the background state to be executed in the foreground state.

According to an embodiment of the disclosure, the user interface manager 620 may control the multi-streaming service application being executed in the background state or the foreground state to maintain the state for a predefined time even when there is a user input of switching the channel. This indicates that the multi-streaming service application corresponding to the current channel is not used when the channel switching has occurred. However, by not closing the multi-streaming service application corresponding to the current channel and maintaining the execution, in a situation in which a channel switching input to the current channel may be received again within a predefined time from the user, the multi-streaming service may be quickly provided.

According to an embodiment of the disclosure, the user interface manager 620 may, for a predefined period of time, output a message indicating that the multi-streaming service of the current channel, that is, the channel before the switching of the channel is available when a channel switching has been made according to the user input of switching the channel, thereby inducing the user to use the multi-streaming service.

Figure 7:
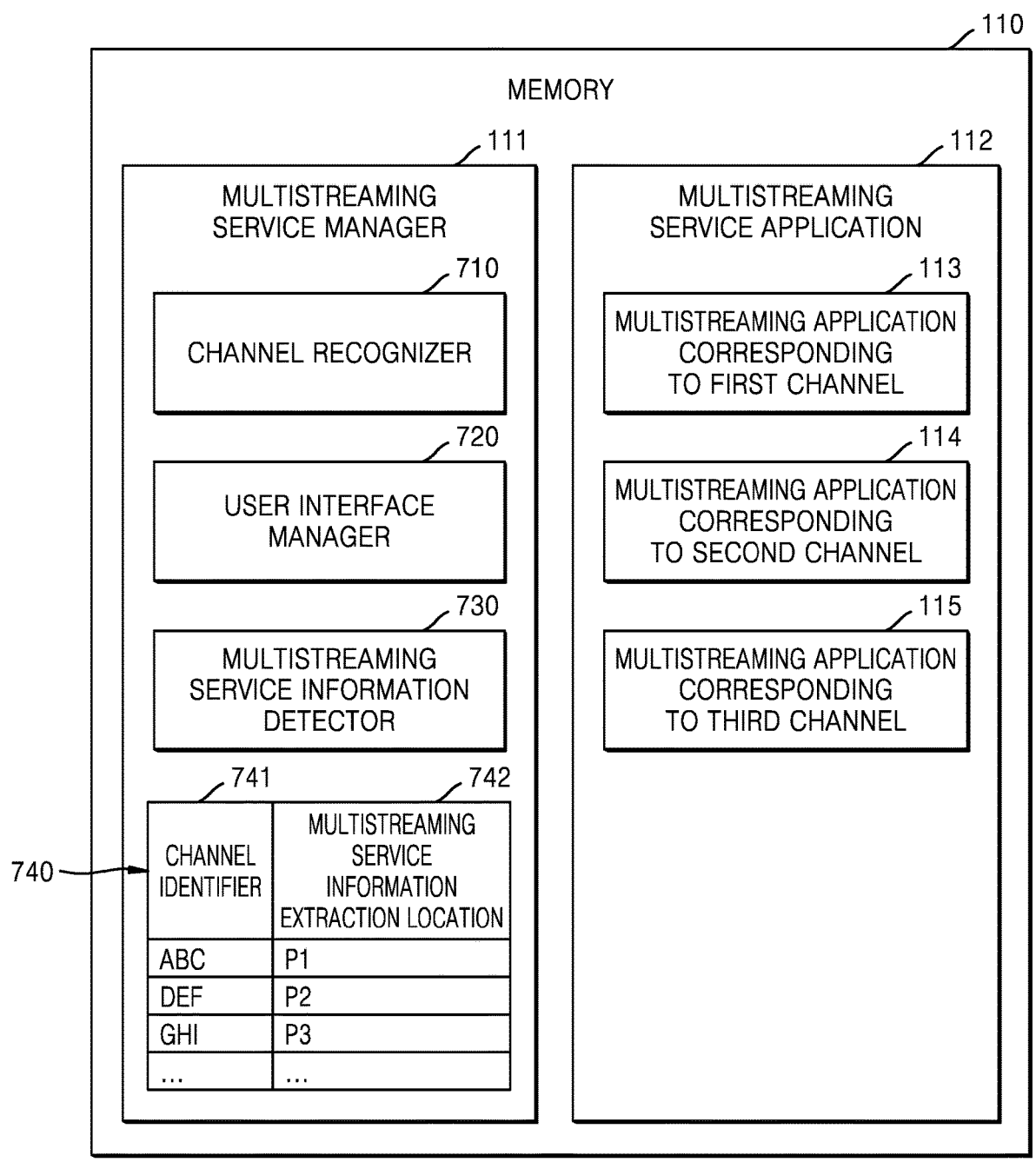
FIG. 7 is an example of a memory configuration for providing a multi-streaming service function according to an embodiment of the disclosure.

FIG. 7 is an example of a memory configuration for providing the multi-streaming service function according to an embodiment of the disclosure.

Referring to FIG. 7, the memory 110 according to an embodiment of the disclosure may include the multi-streaming service manager 111 and the multi-streaming service application 112.

The description of the multi-streaming service application 112, which overlaps the description of FIG. 6, is omitted.

The multi-streaming service manager 111 may include a channel recognizer 710, a user interface manager 720, a multi-streaming service information detector 730, and a table 740.

The channel recognizer 710 may recognize the channel providing the content that is currently displayed by analyzing the content displayed on the screen of the current display 130. For example, the channel recognizer 710 may obtain information about the channel from the content by analyzing the content by using optical character recognition (OCR), automatic content recognition (ACR), etc.

The multi-streaming service information detector 730 may extract the multi-streaming service information from the currently displayed content by analyzing the currently displayed content. For example, the multi-streaming service information detector 730 may obtain the multi-streaming service information from the content by analyzing the content by using OCR, ACR, etc. The multi-streaming service information may include information indicating whether multi-streaming service is to be provided and/or, when the multi-streaming service is provided, information regarding a time point at which the multi-streaming service is provided. The multimedia service information may be provided to the content in a visible form that may be obtained through image extraction, etc. or in an invisible form that may be obtained through watermark extraction such as audio watermarks or digital watermarks.

The location at which the multi-streaming service information may be obtained in the content provided in the channel may be different according to each channel. Therefore, the multi-streaming service information detector 730 according to an embodiment of the disclosure may, referring to the table 740, find a location in which the multi-streaming service information may be obtained correspondingly to the channel recognized by the channel recognizer 710, and may extract the multi-streaming service information from the corresponding found location in the content.

The table 740 may include a channel identifier 741 and a multi-streaming service information extraction location 742. The channel identifier 741 may include one or more channel identifiers that provide the multi-streaming service. The multi-streaming service information extraction location 742 may include information regarding a location that may extract multi-streaming service information from the content provided in the corresponding channel. For example, referring to the table 740 of FIG. 7, regarding the channel identifier ABC, the multi-streaming service information may be obtained in the location P1 of the content, regarding the channel identifier DEF, the multi-streaming service information may be obtained in the location P2 of the content, and, regarding the channel identifier GHI, the multi-streaming service information may be obtained in the location P3 of the content.

According to an embodiment of the disclosure, the multi-streaming service information detector 730 may refer to the table 740 to extract the multi-streaming service information in a predefined location of the currently displayed content, and, when the extracted multi-streaming service information indicates that the corresponding content provides the multi-streaming service, the multi-streaming service information detector 730 may control the multi-streaming service application of the corresponding channel to be executed in the background state.

When the extracted multi-streaming service information according to an embodiment of the disclosure includes information regarding a time point at which the corresponding content provides the multi-streaming service, the user interface manager 720 may generate and output the user interface notifying that the multi-streaming service is available, based on the information regarding the time point at which the multi-streaming service is provided.

When the extracted multi-streaming service information according to an embodiment of the disclosure does not include information regarding a time point at which the corresponding content provides the multi-streaming service, information regarding a time point at which the multi-streaming service is provided may be obtained by allowing the multi-streaming service application to communicate with the server, and the user interface manager 720 may generate and output the user interface notifying that the multi-streaming service is available, based on the information regarding the time point at which the multi-streaming service is provided.

Figure 8:
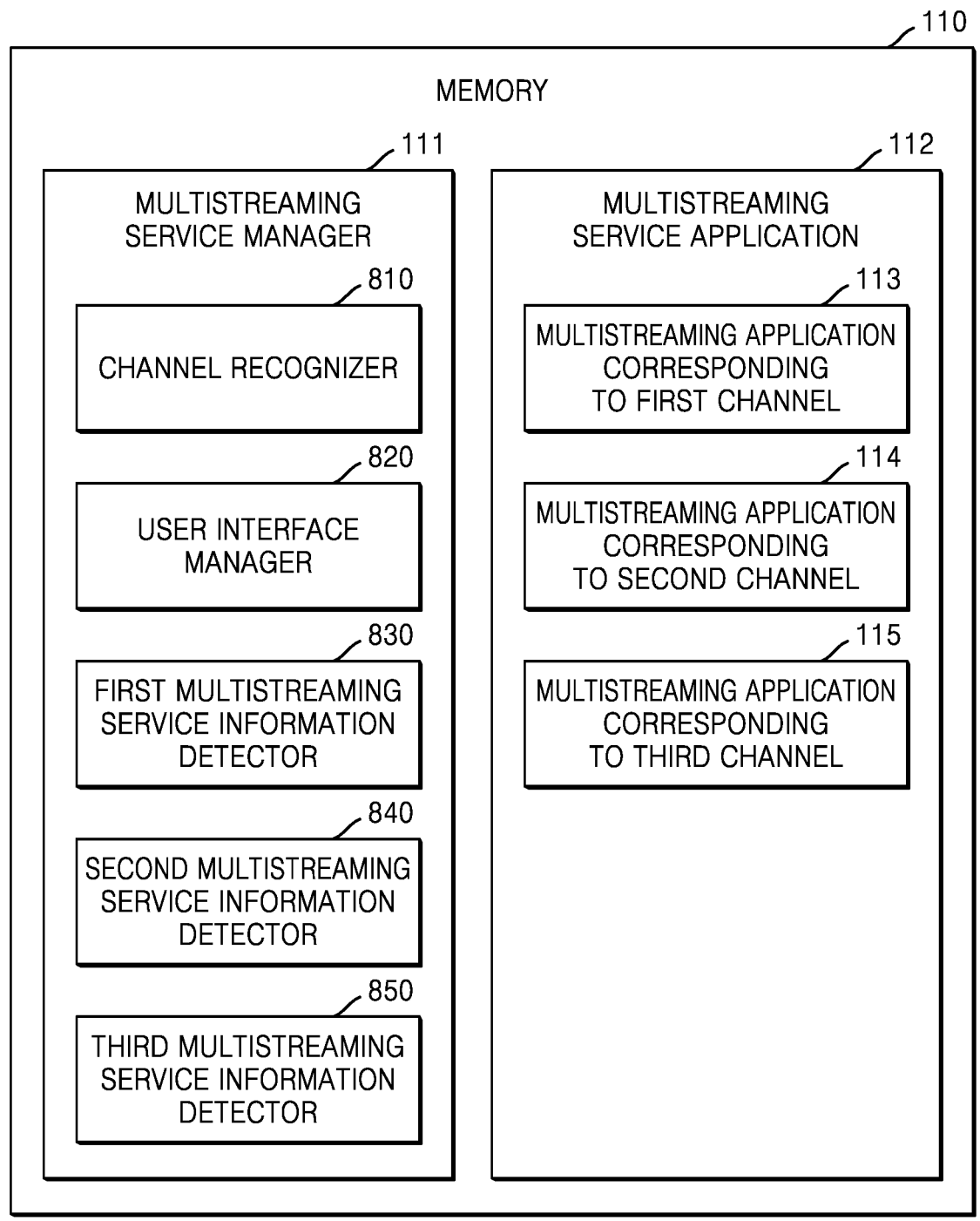
FIG. 8 is another example of a memory configuration for providing a multi-streaming service function according to an embodiment of the disclosure.

FIG. 8 is another example of a memory configuration for providing the multi-streaming service function according to an embodiment of the disclosure.

Referring to FIG. 8, the memory 110 according to an embodiment of the disclosure may include the multi-streaming service manager 111 and the multi-streaming service application 112.

The description of the multi-streaming service application 112, which overlaps the description of FIG. 6, is omitted.

The multi-streaming service manager 111 may include a channel recognizer 810, a user interface manager 820, a first channel multi-streaming service information detector 830, a second channel multi-streaming service information detector 840, and a third channel multi-streaming service information detector 850.

The descriptions of the channel recognizer 810 and the user interface manager 820, which overlap the description of FIG. 7, are omitted.

In FIG. 7, one multi-streaming service information detector 730 extracted the multi-streaming service information in the current content by using the table 740. However, in FIG. 8, a multi-streaming service information detector corresponding to each separate channel, for example, the first channel multi-streaming service information detector 830, the second multi-streaming service information detector 840, or the third channel multi-streaming service information detector 850 is included in each channel.

The multi-streaming service information detector corresponding to each channel may know the location in which the multi-streaming service information is located correspondingly to each channel, and may extract the multi-streaming service information from the currently displayed content through the location.

In FIG. 8, operations of the multi-streaming service information detector corresponding to each channel are identical to those illustrated in the configuration of FIG. 7 except for extracting the multi-streaming service information.

Figure 9:
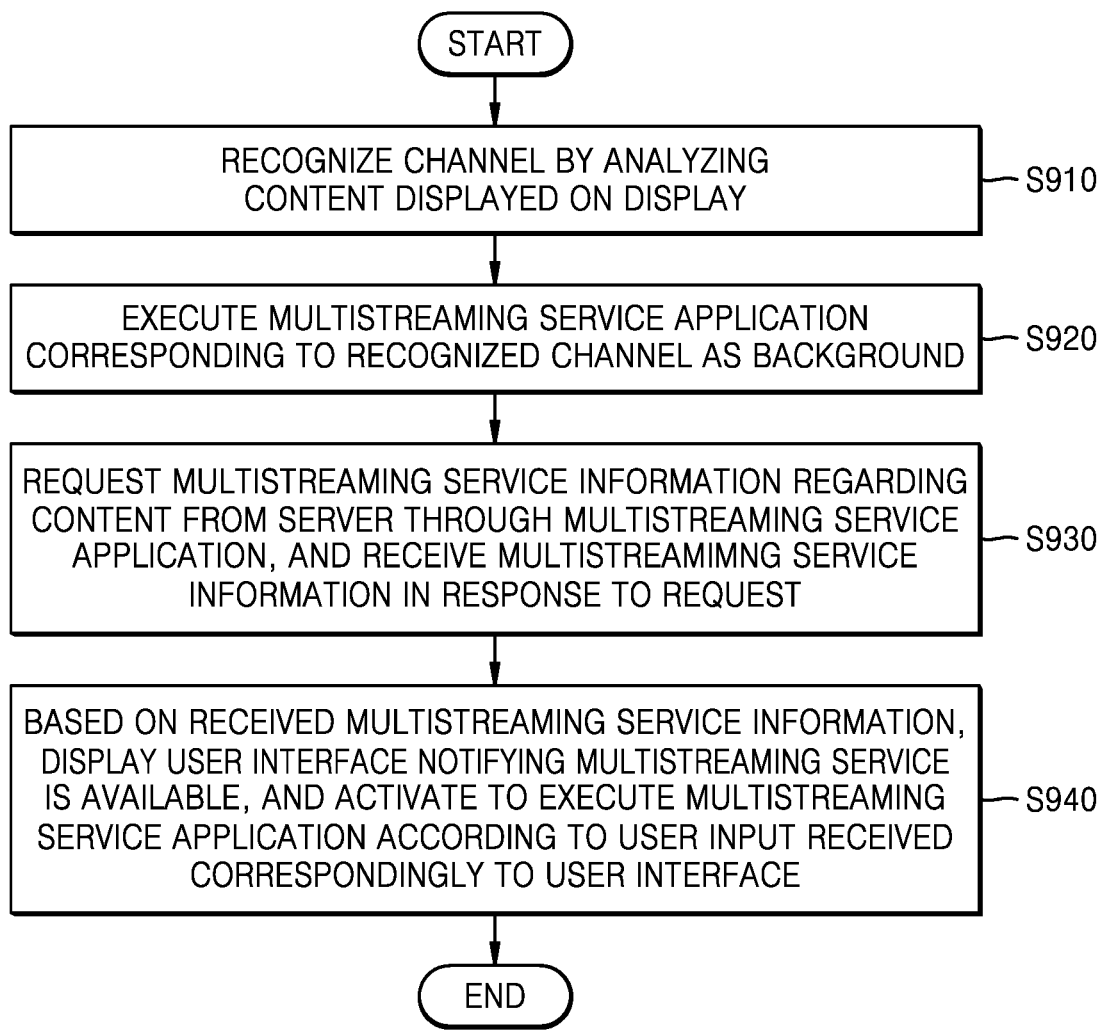
FIG. 9 is an example of a flowchart illustrating an operation of an electronic device, according to an embodiment of the disclosure.

FIG. 9 is an example of a flowchart illustrating an operation of an electronic device, according to an embodiment of the disclosure.

Referring to FIG. 9, in operation 910, the electronic device 100 may recognize the channel that provides content by analyzing the content displayed on the display.

In operation 920, the electronic device 100 may execute a multimedia service application corresponding to the recognized channel as the background.

In operation 930, the electronic device 100 may make the multi-streaming service application communicate with the server to request for the multi-streaming service information regarding the content displayed on the display, and receive the multi-streaming service information from the server in response to the request.

In operation 940, the electronic device 100 may display a user interface notifying that the multi-streaming service is available based on the received multi-streaming service information, and may activate the multi-streaming service application to provide the multi-streaming service according to the user input of selecting the multi-streaming service in response to the user interface.

FIG. 10 is an example of a flowchart illustrating an operation of an electronic device, according to an embodiment of the disclosure.

Referring to FIG. 10A, in operation 1010, the electronic device 100 may receive content from the external source 200 and display the content on the display as a single view screen.

In operation 1011, the electronic device 100 may analyze the content displayed on the display and recognize the channel providing the corresponding content, and may execute the multi-streaming application corresponding to the recognized channel in the background state. Because the user input of selecting the multi-streaming service is not yet received, the electronic device 100 may load and execute the multi-streaming service application program in the memory to not be seen by the user, thereby preparing the multi-streaming service application to be communicable with the server.

In case that, as a result of identifying whether the multi-streaming service application related to the recognized channel is installed, the multi-streaming service application is not installed, the electronic device 100 may output a user interface inducing the installation of the multi-streaming service application. When the user selects to install the multi-streaming service application according to the user interface, the electronic device 100 may download the multi-streaming service application from the server and then install the multi-streaming service application, and control the installed multi-streaming service application to operate as the background.

In operation 1012, the electronic device 100 may obtain the multi-streaming service information by allowing the multi-streaming service application to communicate with the server. Specifically, in operation 1013, the multi-streaming service application may request the multi-streaming service information from the server. The requested multi-streaming service information may include at least one of a content identifier or a channel identifier. In operation 1014, the multi-streaming service application may receive the multi-streaming service information from the server. The multi-streaming service information may include at least one of information indicating whether the multi-streaming service regarding the displayed content is to be provided or, when the multi-streaming service is provided, information regarding a time point at which the multi-streaming service is provided. When the multi-streaming service information received in response to the multi-streaming service information request indicates that the multi-streaming service related to the content is to be provided, in addition to information regarding a time point at which the multi-streaming service regarding the content is provided, information regarding a plurality of content streams provided by the multi-streaming service may be included. Information regarding the plurality of content streams provided by the multi-streaming service may include at least one of a resolution of each content stream, minimum bandwidth and maximum bandwidth, or location information on a network such as a URL (universal resource locator).

In operation 1015, the electronic device 100 may generate and output the user interface based on the received multi-streaming service information.

According to an embodiment of the disclosure, when the multi-streaming service information indicates that the multi-streaming service regarding the corresponding content is provided, and includes information regarding the time point at which the multi-streaming service is provided, the electronic device 100 may output the user interface notifying that the multi-streaming service is available within a predefined time before the time point at which the multi-streaming service is provided. In this case, when there is no selecting input from the user, the electronic device 100 may remain in a state in which the user interface such as an icon for consecutively selecting transition of the multi-streaming service is continuously output during a time period in which the multi-streaming service may be provided.

When the received multi-streaming service information indicates that the multi-streaming service regarding the corresponding content is not provided, the multi-streaming service-related operation, performed by the electronic device 100, may be finished.

In response to the user interface of operation 1015, in operation 1016, a user input of selecting the multi-streaming service may be received.

In operation 1017, the electronic device 100 may control the multi-streaming service application to be completely activated to be in an executable state by executing the multi-streaming service application in the background state to be in the foreground state, and may provide the multi-streaming service, according to the user input of selecting the multi-streaming service. In particular, in operation 1018, by the complete activation state of the multi-streaming service application, the multi-streaming service application may request a multi-streaming content from the server 240, and, in operation 1019, the multi-streaming service application may receive the multi-streaming content from the server 240 to output each of the received multi-streaming content on each divided sub-screen of the display, thereby providing the multi-streaming service.

FIG. 10B is an example of a flowchart illustrating an operation of an electronic device, according to an embodiment of the disclosure.

Operations in FIG. 10B are mostly the same as the operations shown in FIG. 10A, except for the time point at which the multi-streaming content is received. In an example shown in FIG. 10A, in response to the user input of selecting the multi-streaming service, the multi-streaming service application activated to be in the foreground state may request and receive the multi-streaming content form the server, thereby providing the multi-streaming service. On the other hand, in an example shown in 10B, the multi-streaming service application being executed in the background state may store the multi-streaming content in the buffer in advance.

The descriptions until operation 1014 in FIG. 10B, which overlap the descriptions of FIG. 10A, are omitted.

In operation 1020, the electronic device 100 may receive a plurality of multi-streaming contents provided by the multi-streaming service through the multi-streaming service application being executed in the background state. That is, in operation 1021, the multi-streaming service application may request the plurality of content streams provided by the multi-streaming service from the server by using location information on the network such as the URL received from the server, receive the plurality of content streams provided by the multi-streaming service from the server, and store the plurality of content streams in the buffer. In operation 1022, the multi-streaming content may be received from the server and stored in the buffer. In this case, the electronic device 100 may store the multi-streaming content of several seconds to tens of seconds.

In operation 1023, the electronic device 100 may generate and output the user interface based on the multi-streaming service information received from the server.

In response to the user interface of operation 1023, in operation 1024, a user input of selecting the multi-streaming service may be received.

In operation 1025, the electronic device 100 may control the multi-streaming service application to be completely activated to be in an executable state by executing the multi-streaming service application in the background state to be in the foreground state, and may provide the multi-streaming service, according to the user input of selecting the multi-streaming service. In this case, because the multi-streaming content amounting to a predefined amount of time is stored in the buffer in advance through operation 1020, the multi-streaming service may be provided right away using the multi-streaming content from the user in response to the multi-streaming service request from the user. Therefore, in the example shown in FIG. 10B, the multi-streaming service may be provided more rapidly in response to the multi-streaming service request of the user than in the example shown in FIG. 10A.

Figure 11:
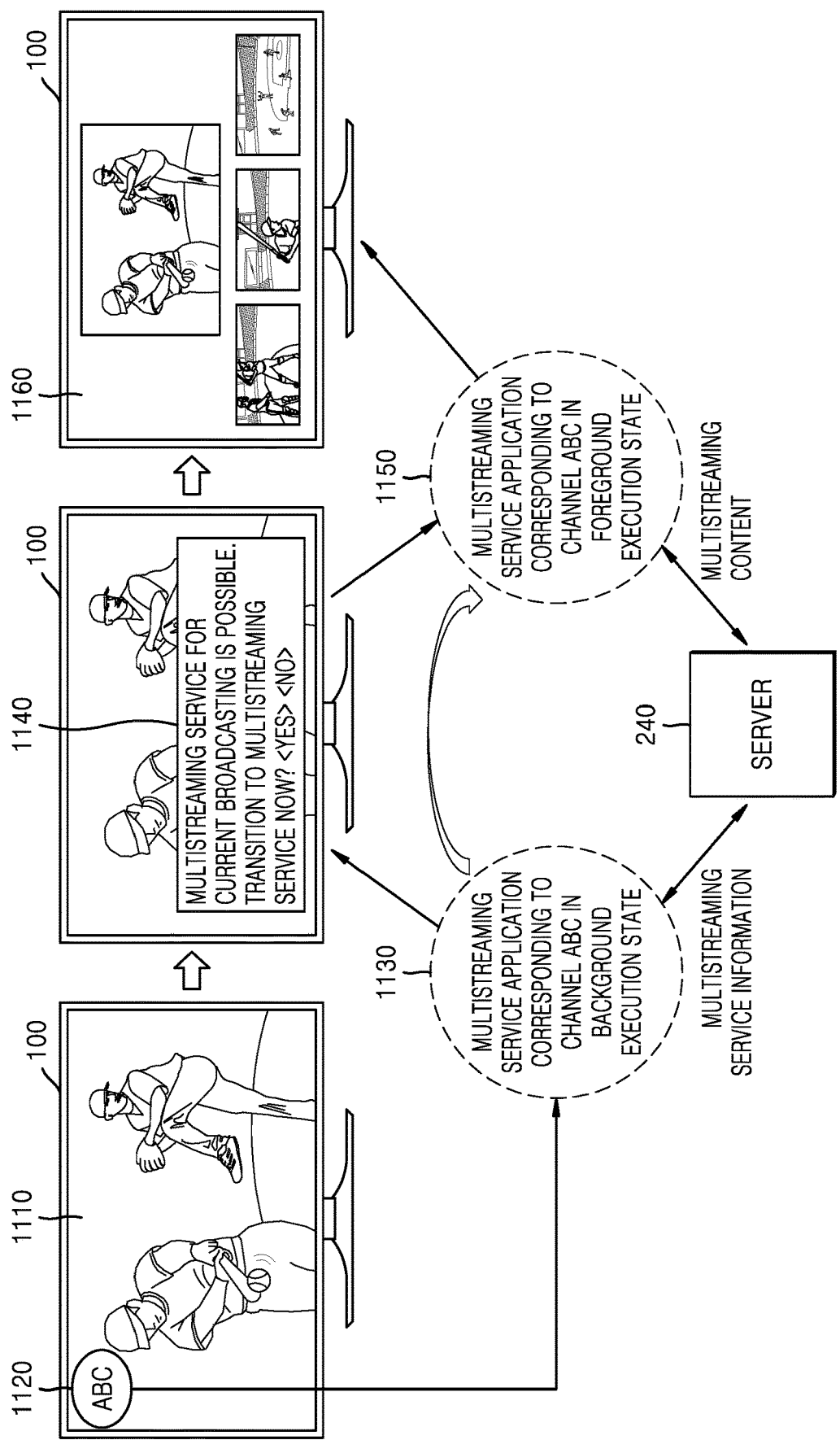
FIG. 11 is a reference diagram for explaining an example of providing a multi-streaming service, according to an embodiment of the disclosure.

FIG. 11 is a reference diagram for explaining an example of providing a multi-streaming service, according to an embodiment of the disclosure.

Referring to FIG. 11, the electronic device 100 may display a baseball game content through a single view screen 1110. The electronic device 100 may recognize that the channel of the currently displayed content is the channel ABC by analyzing the currently displayed baseball game content. As the electronic device 100 recognizes that the channel is the channel ABC, the multi-streaming service application corresponding to the channel ABC may be controlled to operate in the background execution state in operation 1130. The multi-streaming service application corresponding to the channel ABC operating in the background execution state may obtain the multi-streaming service information corresponding to the baseball game content by communicating with the server 240. The electronic device 100 may output a user interface 1140 notifying that the multi-streaming service is available regarding the current baseball game content based on the obtained multi-streaming service information. For example, the user interface may read as "the multi-streaming service for current broadcasting is available. Would you like to transition to the multi-streaming service now? Yes or no." Such a user interface may be output near the time point of providing the multi-streaming service.

When the user selects "yes" according to the user interface, the electronic device 100 may control the multi-streaming service application corresponding to the channel ABC to be in a foreground execution state 1150. When the multi-streaming service application is transitioned to the foreground execution state, the multi-streaming service application may communicate with the server 240 to receive the multi-streaming content from the server 240, and may process and output the received multi-streaming content on each sub-screen of a multi-view screen 1160. The content output on each sub-screen may include, in the corresponding baseball game content, a video focusing on a batter, a video focusing on a catcher, a close-up video of a manager, and a video showing the entire baseball stadium.

Figure 12:
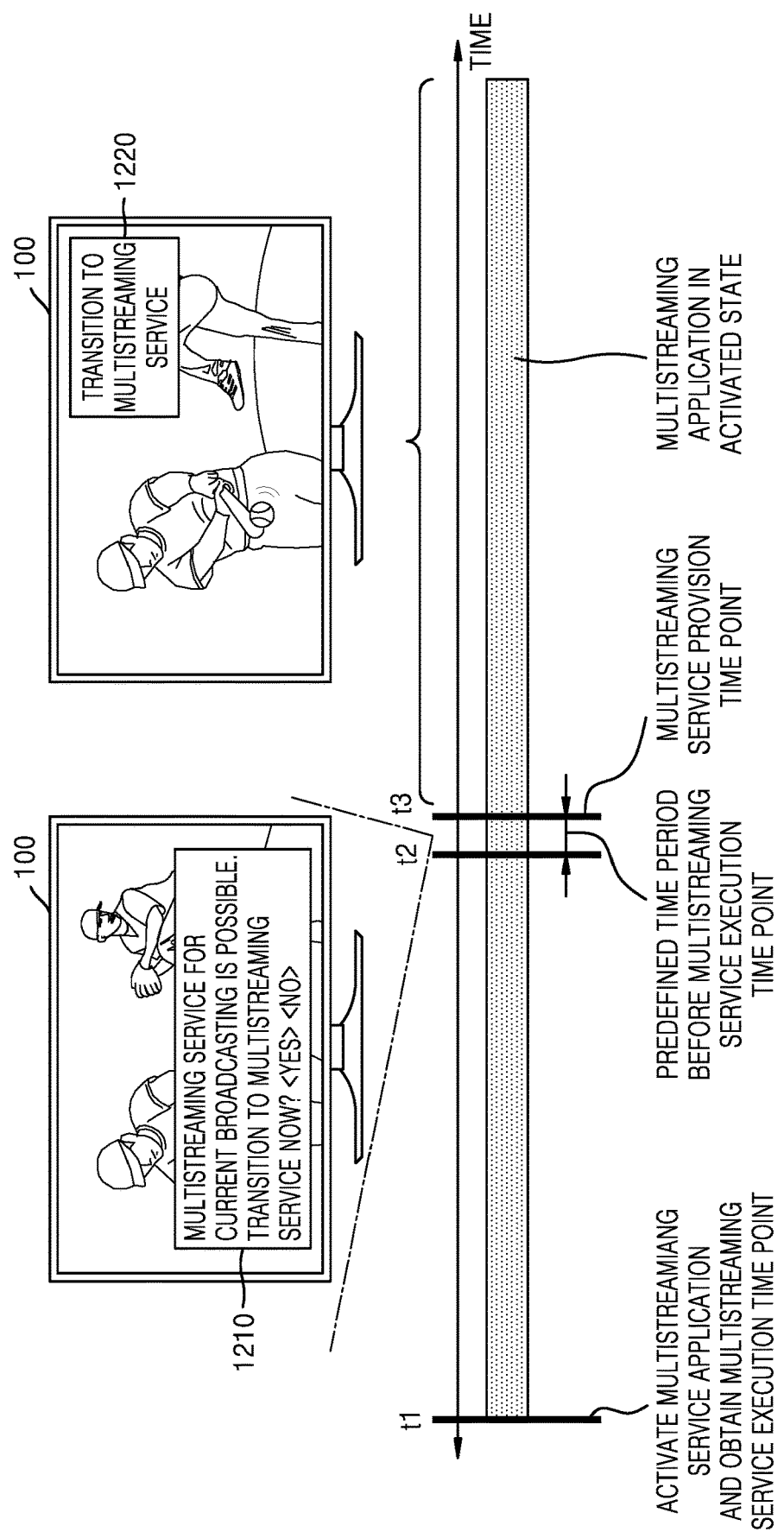
FIG. 12 is a reference diagram for explaining a user interface that may be shown when providing a multi-streaming service, according to an embodiment of the disclosure.

FIG. 12 is a reference diagram for explaining a user interface that may be shown when providing a multi-streaming service, according to an embodiment of the disclosure.

Referring to FIG. 12, the electronic device 100 may, for example, control the multi-streaming service application corresponding to the channel of the content displayed on the display to be in the background execution state at a time point t1, and may obtain information regarding a time point at which the multi-streaming service is provided through the multi-streaming service application.

When a time point of providing the multi-streaming service is t3, during a predefined time before t3, for example, in a time section between t2 and t3, the electronic device 100 may output a user interface 1210 showing that the multi-streaming service is available. Because this is when the multi-streaming service is provided for the first time, a user interface 1210 of a rather big size may be provided, even in case the user interface 1210 covers part of the content, to clearly inquire whether the user desires to transition to the multi-streaming service to induce the user to select the multi-streaming service. When the user selects the multi-streaming service in response the user interface 1210, the multi-streaming service may be provided by executing the multi-streaming service application in the foreground state right away.

In case the user does not select the multi-streaming service in response to such a user interface 1210, the output of the user interface 1210 may be stopped. Instead, the electronic device 100 may output a user interface 1220 that is relatively small in size to induce the transition to the multi-streaming service without interfering with the viewing of the content to continuously induce the selection of the multi-streaming service while the multi-streaming service is provided by the content provider.

Figure 13:
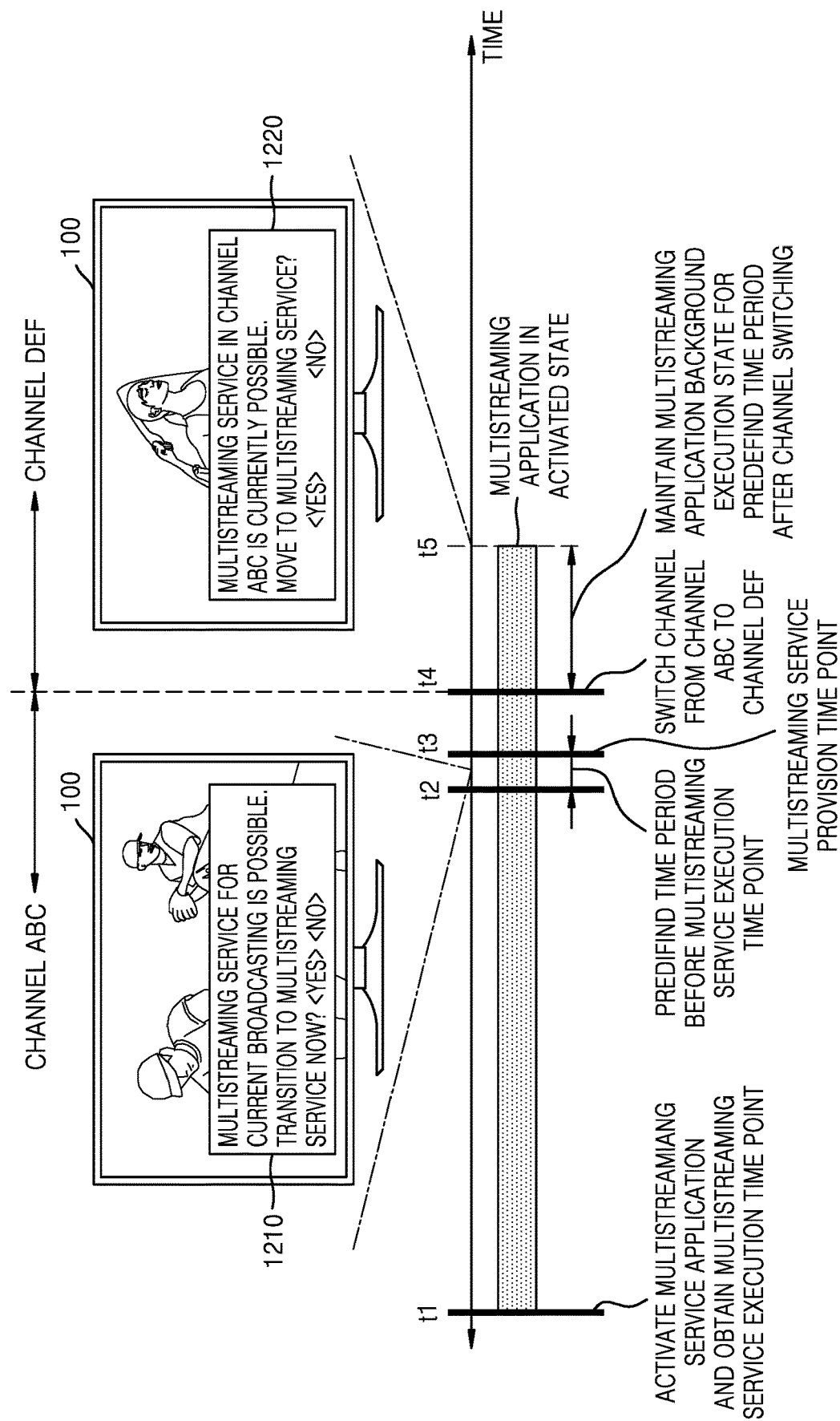
FIG. 13 is a reference diagram for explaining an operation when channel switching occurs in an electronic device while a multi-streaming service application is being executed in a background state, according to an embodiment of the disclosure.

FIG. 13 is a reference diagram for explaining an operation when a channel transition occurs in an electronic device while the multi-streaming service application is being executed in a background state, according to an embodiment of the disclosure.

Referring to FIG. 13, the operation from a time point of t1 to t3 overlaps those of FIG. 12.

The electronic device 100 may receive a user input in response to the user interface 1210 to switch the channel at a time point t4 while displaying the content in the single view screen due to not receiving a user input of selecting the multi-streaming service. For example, the electronic device 100 may receive a channel switching user input to switch from the channel ABC to the channel DEF, and, according to the user input, may switch to the channel DEF to display content provided from the channel DEF.

According to an embodiment of the disclosure, the electronic device 100 may even when the channel is switched according to the channel switching user input, maintain the multi-streaming service application corresponding to the channel ABC in the background execution state from the time point of t4 to a time point of t5. Accordingly, even when the user switches to the channel DEF, when the user returns to the channel ABC within a short period of time and selects the multi-streaming service, a delay in providing the multi-streaming service may be shortened.

According to an embodiment of the disclosure, the electronic device 100 may maintain the multi-streaming service application corresponding to the channel ABC in the background execution state during a predefined time, and, to actively induce the user to experience the multi-streaming service, may output the user interface 1220 indicating that the multi-streaming service is being provided in the channel ABC. When the user selects switching to the channel ABC in response to the user interface 1220, the electronic device 100 may not only perform switching to the channel ABC but may also control the multi-streaming service application to be in the foreground execution state as a result of determining that the user desires to receive the multi-streaming service, thereby providing the multi-view screen.

Figure 14:
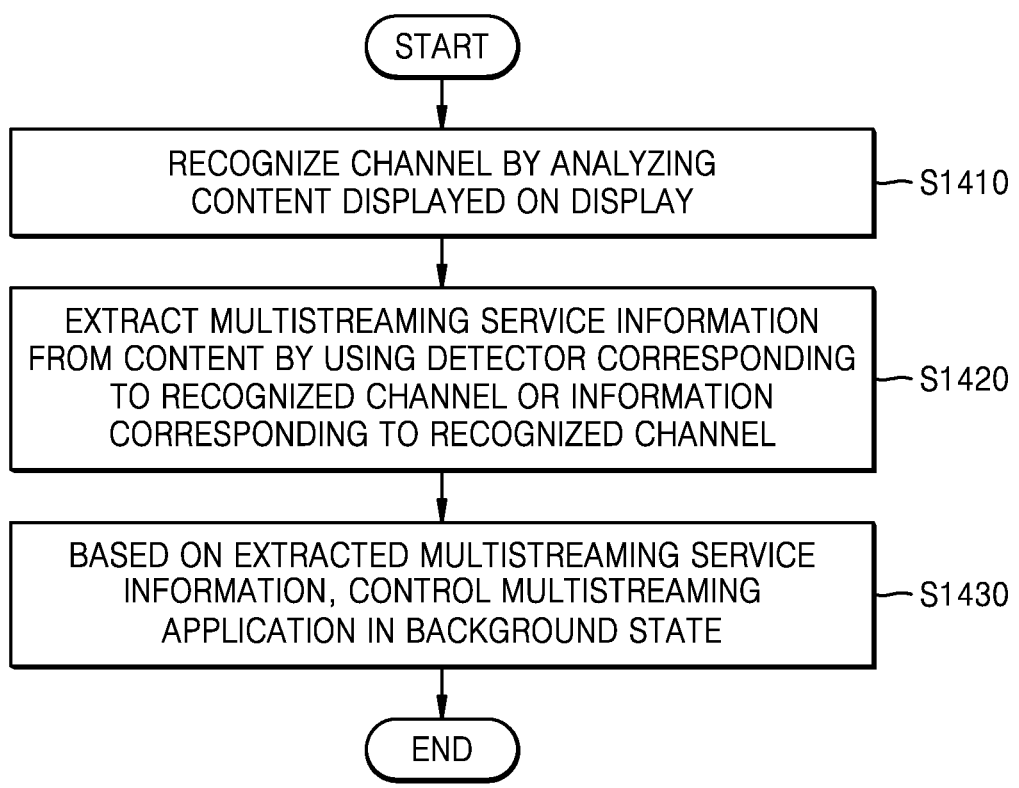
FIG. 14 is an example of a flowchart illustrating a method of operating an electronic device, according to an embodiment of the disclosure.

FIG. 14 is an example of a flowchart illustrating a method of operating an electronic device, according to an embodiment of the disclosure.

Referring to FIG. 14, in operation 1410, the electronic device 100 may recognize the channel that provides content by analyzing the content displayed on the display.

In operation 1420, the electronic device 100 may extract the multi-streaming service information from the content displayed on the screen by using the detector corresponding to the recognized channel or information corresponding to the recognized channel. For example, the electronic device 100 may extract the multi-streaming service information from the content by using the multi-streaming service information detector 730 and the table 740 shown in FIG. 7 or the multi-streaming service information detectors 830, 840, and 850 corresponding to each channel shown in FIG. 8.

In operation 1430, the electronic device 100 may control the multi-streaming service application to be executed in the background state based on the extracted multi-streaming service information.

Figure 15:
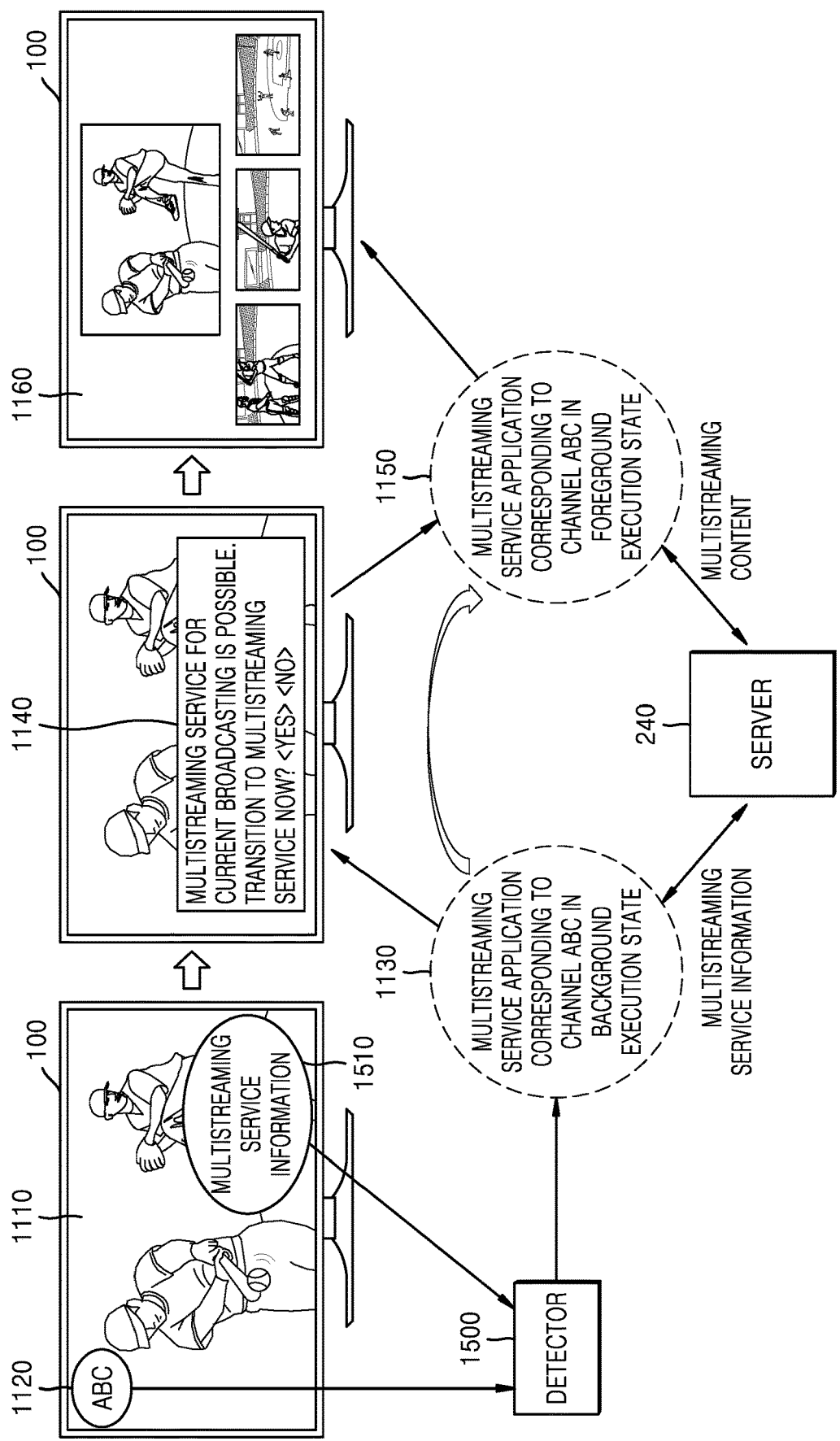
FIG. 15 is a reference diagram for explaining an example of providing a multi-streaming service, according to an embodiment of the disclosure.

FIG. 15 is a reference diagram for explaining an example of providing a multi-streaming service, according to an embodiment of the disclosure.

The difference between scenarios shown in FIG. 15 and FIG. 11 is that, in FIG. 11, when the channel is recognized, the multi-streaming service application corresponding to the recognized channel is controlled to be automatically changed to the background execution state and to obtain the multi-streaming service information from the server, while in FIG. 15, the multi-streaming service information is obtained from the content displayed on the display. Such a scenario may be possible when the multi-streaming service information is input in any way regardless of whether the content provider is in a visible form or an invisible form in the content that it provides, and when the electronic device 100 is allowed to provide information regarding in what location of the content the multi-streaming service information is obtainable.

Referring to FIG. 15, a detector 1500 of the electronic device 100 may receive information regarding the recognized channel from the content displayed on the display, and may obtain the multi-streaming service information through the information corresponding to the recognized channel or a separate detector corresponding to the recognized channel. The multi-streaming service information may include at least one of information indicating whether multi-streaming service related to the corresponding content is to be provided or, when the multi-streaming service is provided, information regarding a time point at which the multi-streaming service is provided. The detector 1500 may include the multi-streaming service information detector 730 shown in FIG. 7 or the multi-streaming service information detectors 830, 840, and 850 shown in FIG. 8.

When the multi-streaming service information indicates that the multi-streaming service is provided for the corresponding content, the detector 1500 may control the multi-streaming service application corresponding to the channel ABC to be in the background execution state. Subsequent movements are as described in FIG. 11.

When the multi-streaming service information includes information until the time point at which the multi-streaming service is provided, the multi-streaming service application corresponding to the channel ABC may not need to access the server to obtain the multi-streaming service information. However, when the multi-streaming service information does not include information until the time point at which the multi-streaming service, the multi-streaming service application may access the server to obtain the multi-streaming service information.

Some embodiment of the disclosure may be implemented in the form of a recording medium including computer-executable instructions, such as a computer-executable program module. A computer-readable medium may be any available medium that is accessible by a computer and may include any volatile and non-volatile media and any removable and non-removable media. Also, the computer-readable recording medium may include any computer storage medium. The computer storage medium may include any volatile and non-volatile media and any removable and non-removable media implemented by any method or technology for storing information such as computer-readable instructions, data structures, program modules, or other data.

The disclosed embodiments of the disclosure may be implemented as a software (S/W) program including instructions stored in a computer-readable storage medium.

The computer is a device capable of fetching instructions stored in the recording medium, and operating according to the embodiments of the disclosure based on the fetched instructions, and may include the electronic device according to the embodiments of the disclosure.

The computer-readable storage medium may be provided in the form of a non-transitory storage medium. When the recording medium is 'non-transitory', it means that the recording medium does not include signals and is tangible, and it does not limit that data is semi-permanently or temporarily stored in the recording medium.

Also, a control method according to disclosed embodiments of the disclosure may be provided in a computer program product. The computer program product may be traded between a seller and a purchaser as a commodity.

The computer program product may include a S/W program and a computer-readable storage medium having stored therein the S/W program. For example, the computer program product may include a S/W program-type product (e.g., a downloadable application) electronically distributed through a manufacturer of a device or an electronic market (e.g., Google Play™ store or App Store). For electronic distribution, at least a portion of the S/W program may be stored in a storage medium or may be temporarily generated. In this case, the storage medium may be a storage medium of a server of a manufacturer or a server of an electronic market, or a storage medium of a relay server, which temporarily stores the S/W program.

The computer program product may include a storage medium of a server or a storage medium of a device in a system including a server and a device. Alternatively, when there is a third device, e.g., a smartphone, that communicates with the server or the device, the computer program product may include a storage medium of the third device. Alternatively, the computer program product may include S/W program itself transmitted from the server to the device or the third device, or transmitted from the third device to the device.

In this case, one of the server, the device, and the third device may execute a computer program product to perform the method according to the disclosed embodiments of the disclosure. Alternatively, two or more of the server, the device, and the third device may execute the computer program product to perform the method according to the embodiments of the disclosure in a distributed fashion.

For example, the server (for example, a cloud server or an AI server) may execute the computer program product stored in the server and control the terminal connected with the server for communication to perform the method according to the embodiments of the disclosure.

As another example, the third device may execute the computer program product and control the device connected to the third device for communication to perform the method according to the embodiments of the disclosure. When the third device executes the computer program product, the third device may download a computer program product from the server and execute the downloaded computer program product. Alternatively, the third device may execute the computer program product provided in a free-loaded state and perform the method according to the embodiments of the disclosure.

Also, the term "module" or "-or/-er" used herein may be a hardware component such as a processor or a circuit, and/or a software component executed by a hardware component such as a processor.

The foregoing description of the disclosure is for illustration and those of ordinary skill in the art will appreciate that modifications may be easily made to other specific forms without changing the technical spirit or essential features of the disclosure. Therefore, it will be understood that the embodiments of the disclosure described above are illustrative in all aspects and not restrictive. For example, each element described as a single type may be implemented in a distributed manner. Similarly, elements described as distributed may be implemented in a combined form.

The scope of the disclosure is indicated by the claims rather than the above detailed description, and it should be construed that all changes or modifications derived from the meaning and scope of the claims and equivalent concepts thereof fall within the scope of the disclosure.

What is claimed is:

1. An electronic device comprising:
   a memory storing one or more instructions; and
   a processor configured to execute the one or more instructions to:
      recognize a channel providing content displayed on a display by analyzing the content displayed on the display,
      execute a multi-streaming service application corresponding to the recognized channel as a background, request multi-streaming service information regarding the content from a server through the multi-streaming service application, receive the multi-streaming service information in response to the request, based on the received multi-streaming service information, display a first user interface notifying that a multi-streaming service regarding the content is available, and, according to a user input received in response to the first user interface, activate and execute the multi-streaming service application.

2. The electronic device of claim 1, wherein the multi-streaming service information comprises at least one of information indicating whether the multi-streaming service regarding the content is provided or information regarding a time point at which the multi-streaming service regarding the content is provided.

3. The method of claim 1, wherein the processor is further configured to execute the one or more instructions to:

identify whether the recognized channel supports the multi-streaming service, and, based on identifying that the channel supports the multi-streaming service, execute the multi-streaming service application as the background.

4. The electronic device of claim 2, wherein the processor is further configured to execute the one or more instructions to:

based on the time point at which the received multi-streaming service is provided, display the first user interface notifying that the multi-streaming service regarding the content is available within a predefined time before a time point at which the multi-streaming service starts.

5. The electronic device of claim 1, wherein the processor is further configured to execute the one or more instructions to:

receive, from the server, a plurality of multi-streaming contents provided by the multi-streaming service through the multi-streaming service application executed as the background and store the plurality of multi-streaming contents in a buffer.

6. The electronic device of claim 1, wherein the processor is further configured to execute the one or more instructions to:

based on receiving a user input for switching the channel to another channel, maintain a background execution state of the multi-streaming service application for a preset time.

7. The electronic device of claim 6, wherein the processor is further configured to execute the one or more instructions to:

while displaying the content corresponding to the other channel on the display according to the user input to switch the channel, output a second user interface notifying that the multi-streaming service is available in the channel before the channel is switched.

8. The electronic device of claim 7, wherein the processor is further configured to execute the one or more instructions to:

according to the receiving of the user input in response to the second user interface, automatically switch the other channel to the channel.

9. The electronic apparatus of claim 8, wherein the processor is further configured to execute the one or more instructions to:

according to the receiving of the user input in response to the second user interface, automatically switch the other channel to the channel and simultaneously activate the multi-streaming service application to provide a multi-view screen.

10. The electronic device of claim 9, wherein the processor is further configured to execute the one or more instructions to:

according to the activating and executing of the multi-streaming service application, receive the multi-streaming content from the server and provide the multi-view screen.

11. A method of operating an electronic device, the method comprising:

recognizing a channel providing content displayed on a display by analyzing the content displayed on the display;

executing a multi-streaming service application corresponding to the recognized channel as a background;

requesting multi-streaming service information regarding the content from a server through the multi-streaming service application;

receiving the multi-streaming service information in response to the request;

based on the received multi-streaming service information, displaying a user interface notifying that a multi-streaming service regarding the content is available; and, according to a user input received in response to the user interface, activating and executing the multi-streaming service application.

12. The method of claim 11, wherein the multi-streaming service information comprises at least one of information indicating whether the multi-streaming service regarding the content is provided or information regarding a time point at which the multi-streaming service regarding the content is provided.

13. The method of claim 11, further comprising:

identifying whether the recognized channel supports the multi-streaming service; and, based on identifying that the channel supports the multi-streaming service, executing the multi-streaming service application as the background.

14. The method of claim 12, further comprising:

based on the time point at which the received multi-streaming service is provided, displaying the user interface notifying that the multi-streaming service regarding the content is available within a predefined time before a time point at which the multi-streaming service is provided.

15. A non-transitory computer-readable storage medium comprising one or more programs executed by a processor of an electronic device to implement a method of operating an electronic device, the method of operating the electronic device comprising:

recognizing a channel providing content displayed on a display by analyzing the content displayed on the display;

executing a multi-streaming service application corresponding to the recognized channel as a background;

requesting multi-streaming service information regarding the content from a server through the multi-streaming service application;

receiving the multi-streaming service information in response to the request;

based on the received multi-streaming service information, displaying a user interface notifying that a multi-streaming service regarding the content is available; and, according to a user input received in response to the user interface, activating and executing the multi-streaming service application.

\* \* \* \* \*